US012510804B1

(12) United States Patent
Chen et al.

(10) Patent No.: US 12,510,804 B1
(45) Date of Patent: Dec. 30, 2025

(54) OPTICAL SYSTEM HAVING PIXEL-BASED DIAPHRAGM

(71) Applicant: Liqxtal Technology Inc., Tainan (TW)

(72) Inventors: Hung-Shan Chen, Tainan (TW); Sung-Nan Chen, Tainan (TW); Chia-Ming Chang, Tainan (TW); Ming-Syuan Chen, Tainan (TW)

(73) Assignee: Liqxtal Technology Inc., Tainan (TW)

( * ) Notice: Subject to any disclaimer, the term of this patent is extended or adjusted under 35 U.S.C. 154(b) by 0 days.

(21) Appl. No.: 18/948,439

(22) Filed: Nov. 14, 2024

(51) Int. Cl.
*G03B 9/02* (2021.01)
*G02F 1/1335* (2006.01)
*H04N 13/211* (2018.01)
*H04N 23/75* (2023.01)

(52) U.S. Cl.
CPC ......... *G03B 9/02* (2013.01); *G02F 1/133541* (2021.01); *H04N 13/211* (2018.05); *H04N 23/75* (2023.01)

(58) Field of Classification Search
None
See application file for complete search history.

(56) References Cited

U.S. PATENT DOCUMENTS

| 2014/0016080 A1* | 1/2014 | Chen | G02F 1/29 349/200 |
| 2022/0208897 A1* | 6/2022 | Yue | H04N 23/55 |

\* cited by examiner

*Primary Examiner* — Tyler W. Sullivan
(74) *Attorney, Agent, or Firm* — CKC & Partners Co., LLC

(57) ABSTRACT

An optical system includes a light-receiving plane, a lens group, a pixel-based diaphragm, and a driving unit. The lens group is configured to direct an incident light to the light receiving plane. The pixel-based diaphragm is at an aperture stop of the lens group. The pixel-based diaphragm includes a first substrate coated with pixelated electrodes; a second substrate coated with an electrode; and an active medium layer between the first substrate and the second substrate. The driving unit is electrically coupled with the pixel-based diaphragm and configured to control the pixel-based diaphragm to have a first light transmitting pattern at a first time duration and a second light transmitting pattern at a second time duration, wherein the first light transmitting pattern is different from the second light transmitting pattern.

15 Claims, 20 Drawing Sheets

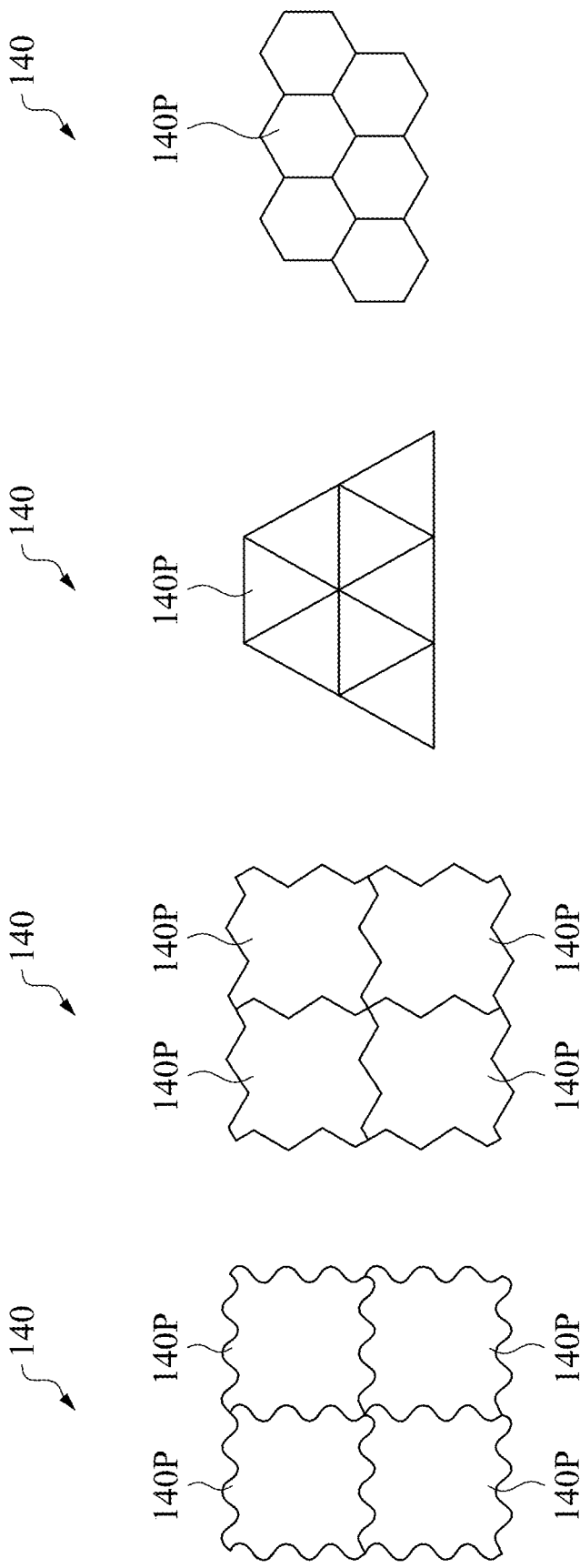

OPTICAL SYSTEM HAVING PIXEL-BASED DIAPHRAGM

BACKGROUND

Field of Invention

The present disclosure relates to an optical system having a pixel-based diaphragm.

Description of Related Art

Liquid crystals are widely used for optical devices due to the large electro-optic modulation resulting from the high optical anisotropy, the electrically tuning capability at low voltages, and the design flexibility on various substrates. For example, liquid crystal devices play an important role in many optical systems by means of the change in the phase or the polarization state of light.

SUMMARY

According to some embodiments of the present disclosure, an optical system includes a light-receiving plane, a lens group, a pixel-based diaphragm, and a driving unit. The lens group is configured to direct an incident light to the light receiving plane. The pixel-based diaphragm is at an aperture stop of the lens group. The pixel-based diaphragm includes a first substrate, a second substrate, and an active medium layer. The first substrate is coated with pixelated electrodes. The second substrate is coated with an electrode. The active medium layer is between the first substrate and the second substrate. The driving unit is electrically coupled with the pixel-based diaphragm and configured to control the pixel-based diaphragm to have a first light transmitting pattern at a first time duration and a second light transmitting pattern at a second time duration, wherein the first light transmitting pattern is different from the second light transmitting pattern.

In some embodiments, the lens group comprises a first lens and a second lens, and the pixel-based diaphragm is between the first lens and the second lens.

In some embodiments, the pixel-based diaphragm comprises at least one polarizer.

In some embodiments, the polarizer is a circular polarizer on a side of the active medium layer facing the incident light.

In some embodiments, the first light transmitting pattern is a transmitting region on an optical axis of the optical system.

In some embodiments, the first light transmitting pattern is a transmitting region spaced apart from an optical axis of the optical system.

In some embodiments, the first light transmitting pattern has a first transmitting region, a second transmitting region, and a third transmitting region. The second transmitting region is between the first and third transmitting regions. A transmittance of the first light transmitting pattern decreases from the first transmitting region to the third transmitting region.

In some embodiments, the optical system further includes an image sensor at the light-receiving plane and a controller electrically coupled with the driving unit and the image sensor. The image sensor is configured to capture a first image at the first time duration and capture a second image at the second time duration, and the controller is configured to generate a three-dimensional image based on the first and second images.

According to some embodiments of the present disclosure, an optical system includes a light-receiving plane, a lens group, a pixel-based diaphragm, and a driving unit. The lens group is configured to direct an incident light to the light-receiving plane. The pixel-based diaphragm is in front of the light-receiving plane towards the incident light. The pixel-based diaphragm locates on a first side of a aperture stop of the lens group facing the light-receiving plane or on a second side of the aperture stop of the lens group facing away from the light-receiving plane. The pixel-based diaphragm comprises a first substrate coated with pixelated electrodes; a second substrate coated with an electrode; and an active medium layer between the first substrate and the second substrate. The driving unit is electrically coupled with the pixel-based diaphragm and configured to control the pixel-based diaphragm to have a first light transmitting pattern at a first time duration and a second light transmitting pattern at a second time duration, wherein the first light transmitting pattern is different from the second light transmitting pattern.

In some embodiments, the lens group comprises a first lens and a second lens, and the pixel-based diaphragm is between the first lens and the second lens.

In some embodiments, the pixel-based diaphragm comprises at least one polarizer.

In some embodiments, the polarizer is a circular polarizer on a side of the active medium layer facing the incident light.

In some embodiments, the first light transmitting pattern is a transmitting region on an optical axis of the optical system.

In some embodiments, the first light transmitting pattern is a transmitting region spaced apart from an optical axis of the optical system.

In some embodiments, the first light transmitting pattern has a first transmitting region, a second transmitting region, and a third transmitting region, the second transmitting region is between the first and third transmitting regions, and a transmittance of the first light transmitting pattern decreases from the first transmitting region to the third transmitting region.

Based on the above description, one advantage is that an optical system is integrated with a pixel-based liquid crystal panel as a tunable diaphragm. The transmittance of each pixel is locally controlled with thin film transistors. With the pixel-based liquid crystal panel, the pupil of the diaphragm has more flexibility in size, location, shape, and transmittance. Another advantage is that the pixel-based tunable diaphragm provides the imaging system more functions: designable bokeh feature, dynamic black card and dynamic illumination angle.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

FIGS. 2C-2F are top views of pixel-based diaphragms according to some embodiment of the disclosure.

DETAILED DESCRIPTION

Figure 1:
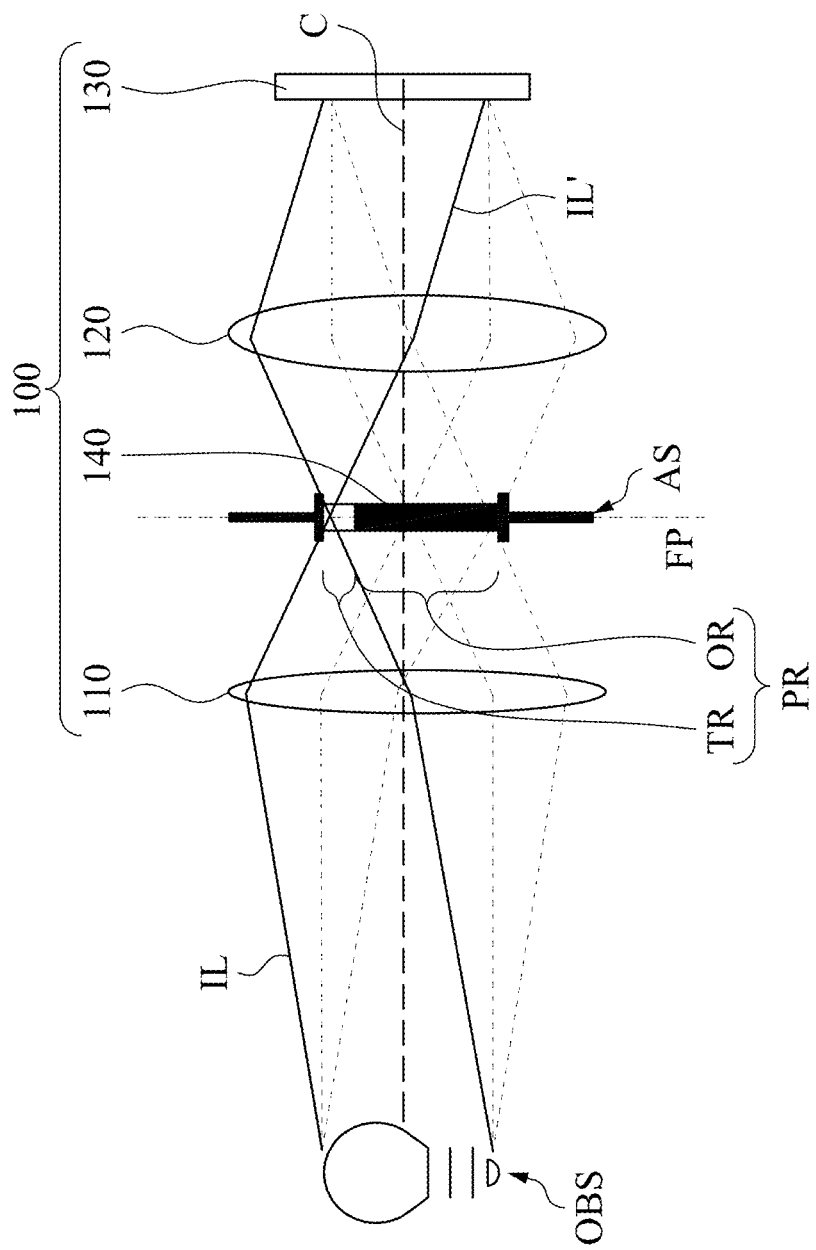
FIG. 1 is a schematic diagram of an optical imaging system according to some embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Imaging systems contains iris diaphragms to control the amount of light passing through the system. The size, shape and transmittance of the diaphragm affects the image in different ways. Mechanical tunable diaphragm applies mechanically movable blades to form a hole at the center. The size of the hole affects the amount of light passing through the optical system and the depth of focus.

FIG. 1 is a schematic diagram of an optical imaging system 100 according to some embodiment of the disclosure. The optical imaging system 100 includes a first lens component 110, a second lens component 120, an image sensor 130, and a pixel-based diaphragm 140 placed along an optical axis C of the optical imaging system 100. The first lens component 110 receives light from a scene/object OBS. The second lens component 120 receives light from the first lens component 110. The image sensor 130 receives light from the second lens component 120. Each of the first lens component 110 and the second lens component 120 may be formed by a single lens or formed by a plurality of lenses. FIG. 1 shows a single-lens configuration for the first lens component 110 and a single-lens configuration for the second lens component 120.

Optical axis is an imaginary line passing through both the centers of curvatures of the optical surfaces of a lens or mirror. Optical axis may be an optical centerline for all the centers of an optical element(s) of an optical system. The optical axis is also the reference axis in which a particular degree of rotational symmetry is defined for an optical system. The path of a light ray along this axis is perpendicular to the surfaces and, as such, will be substantially unchanged.

In some embodiments, the first lens component 110 is conjugated with the second lens component 120. For example, the first lens component 110 has a focal plane at a same position as a focal plane of the second lens component 120. The focal planes of the first lens component 320 and the second lens component 330 can be considered as a focal plane FP of a lens group including the first lens component 110 and the second lens component 120. In some embodiments, the position of the focal plane FP of the lens group is referred to as a position of an aperture stop AS of the entire optical imaging system 100. The aperture stop AS is an iris physically limiting the solid angle of rays passing through the optical system from an on-axis object point. The aperture stop AS can limit the amount of light entering by restricting the beam size in the optical system. For example, the aperture stop AS is at location where the smallest beam size occurs in the optical imaging system 100 and on the optical axis C. The location of the aperture stop AS varies in different optical system.

In some embodiments of the present disclosure, the pixel-based diaphragm 140 is disposed at the aperture stop AS of the entire optical imaging system 100 between the first lens component 110 and the second lens component 120.

Since light from the scene/object OBS with different angle passes through different location of the aperture stop AS, the pixel-based diaphragm 140 at the aperture stop AS can control the angle of light from the scene/object OBS to be imaged (e.g., to the image sensor 130). The pixel-based diaphragm 140 may provide an angular-type attenuation.

The pixel-based diaphragm 140 may include a pixel array region PR, where the pixels (the pixels 140P mentioned later) are disposed. The pixel-based diaphragm 140 controls the light transmittance thereof in 2 states to achieve various shapes of the light transmitting region/pattern TR in the pixel array region PR, while the other region of the pixel array region PR does not substantially allow light transmission and are referred to as an opaque region OR. The light transmitting region/pattern TR can be in any shape, at multiple positions, with any transmittance gray scale.

Figure 2A:
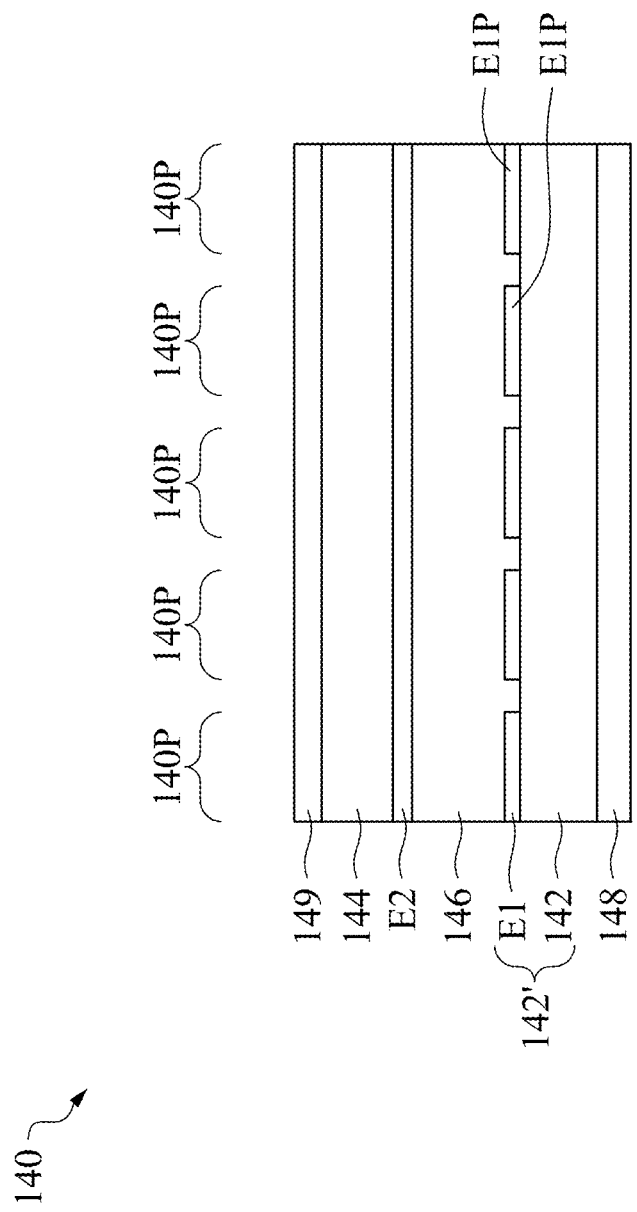
FIG. 2A is a schematic cross-sectional view of a pixel-based diaphragm according to some embodiment of the disclosure.

FIG. 2A is a schematic cross-sectional view of a pixel-based diaphragm 140 according to some embodiment of the disclosure. The pixel-based diaphragm 140 may be an active-matrix liquid crystal panel, which locally controls the transmittance. Thus, the pixel-based diaphragm 140 may serve as a programmable diaphragm. In some embodiments, the pixel-based diaphragm 140 may include a first substrate 142, a second substrate 144, an active medium layer 146, electrode layers E1 and E2, and optical films 148 and 149. The active medium layer 146 is between the first substrate 142 and the second substrate 144. In some embodiments, the first substrate 142 and the second substrate 144 may be coated with alignment layers for providing parallel alignments to the active medium layer 146 (anti-parallel). In some embodiments, the active medium layer 146 may be polymer-dispersed liquid crystal (PDLC), cholesteric liquid crystal, or any other suitable types of the liquid crystal. In some embodiments, the active medium layer 146 may be doped with dye molecules. The electrode layers E1 and E2 may include suitable transparent conductive materials with low reflection, such as molybdenum oxide or molybdenum alloy. The electrode layer E1 is between the first substrate 142 and the active medium layer 146, for example, coated on a surface of the first substrate 142 facing the active medium layer 146. The electrode layer E2 is between the second substrate 144 and the active medium layer 146, for example, coated on a surface of the second substrate 144 facing the active medium layer 146. The electrode layers E1 and E2 may be patterned. For example, the electrode layer E1 has a plurality of pixel electrodes (pixelated electrodes) E1P.

In some embodiments, the first substrate 142 and the electrode layer E1 in combination are referred to as an active-matrix device substrate 142'. For example, the active-matrix device substrate 142' includes switching elements (also referred to as active elements), such as TFTs, are arranged in a matrix array on the first substrate 142. The switching elements are respectively connected to the pixel electrodes E1P of the electrode layer E1 and a plurality of scanning lines and data lines on the first substrate 142, which intersect with each other on the first substrate 142. For example, the active-matrix device substrate 142' may use a layout of pixels of storage-capacitor-on-gate designs. In some embodiments, to increase the aperture ratio of the liquid crystal panel, one can apply low-temperature polycrystalline silicon (LTPS) process to reduce the size of the TFT, thereby increasing the aperture ratio of the pixel-based diaphragm 140.

The pixel-based diaphragm 140 may include a plurality of pixels 140P. The light transmittance of each pixel 140P can be individually controlled in at least 2 states by the switching elements (e.g., TFT) in the active-matrix device substrate 142'. By individually control the transmittance of the pixels 140P, the pixel-based diaphragm 140 blocks the light and allows light to pass through only at the desired positions. The light transmitting pattern of the pixel-based diaphragm 140 can be in any shape, at multiple positions, with any transmittance gray scale. To be specific, each of pixels 140P may include a switching element and a pixel electrode E1P, a gate of the switching element is connected to one of the scanning lines, and a source of the switching element is connected to one of the pixel electrodes E1P. Further, the pixel electrode E1P forms a pixel capacitance (also referred to as a liquid crystal capacitance) together with an active medium layer 146 and the electrode layer E2. The electrode layer E2 may also be referred to as counter electrode in some embodiments.

The optical films 148 and 149 are polarizers with opposite polarization directions. In some embodiments, the optical films 148 and 149 are circular polarizers, which may include polarizer and phase retarders. For example, the optical films 148 and 149 are respectively left-handed and right-handed circular polarizers, and vice versa. In some examples, the optical films 148 and 149 are linear polarizers with the polarization direction perpendicular to each other. The optical films 148 and 149 may be attached to surfaces of the first substrate 142 and the second substrate 144. The optical films 148 and 149 manipulate the incident light to minimize the reflection from the electrode layer E1 on the first substrate 142 and the electrode layer E2 on the second substrate 144.

The pixel-based diaphragm 140 may have a transmittance ranging from 0.1% to 90%. In some embodiments, the pixel-based diaphragm 140 is a normally-on device, in which the pixel-based diaphragm 140 has a maximum transmittance when no voltage is applied on the electrode layers E1 and E2 thereof. In some embodiments, a difference between a transmittance of the light transmitting region/pattern TR of the pixel-based diaphragm 140) and a transmittance of the opaque region OR may be in a range from about 20% to about 40%. The aperture ratio of the pixel-based diaphragm 140 can be higher than 90%.

Figure 2B:
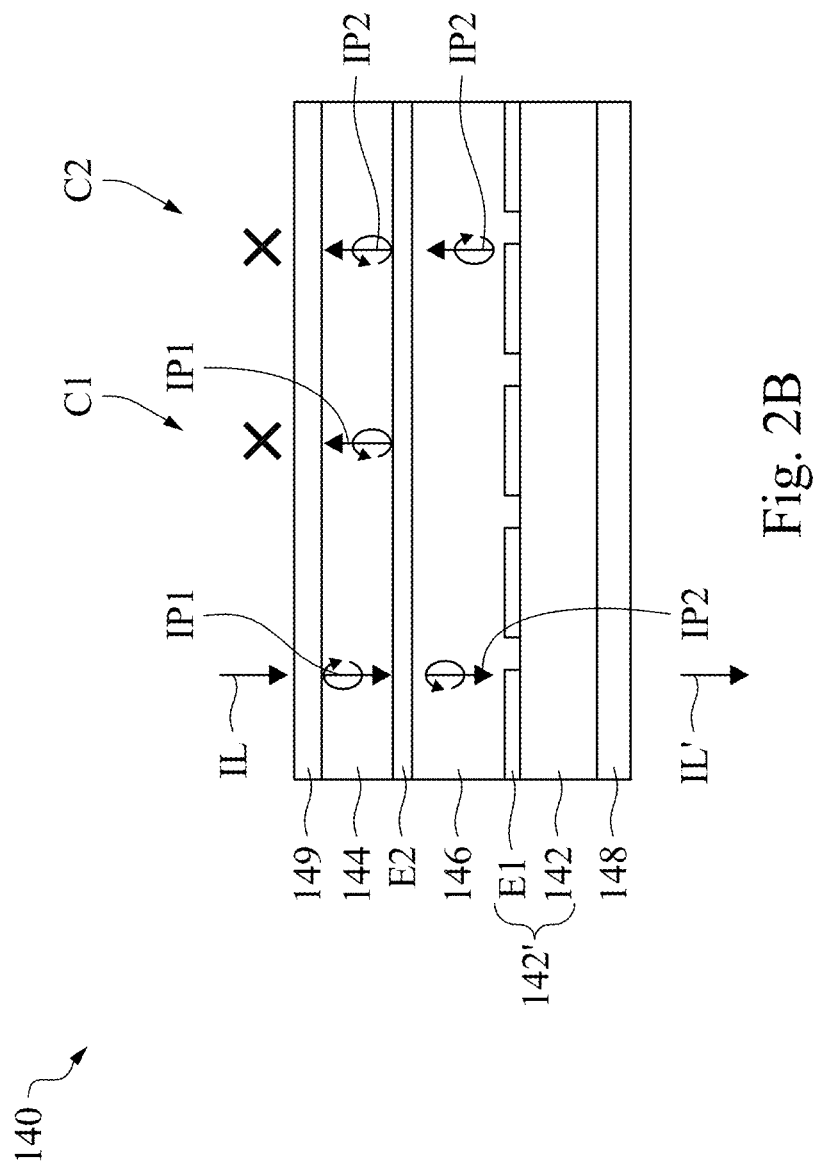
FIG. 2B illustrates the principle of operation and an anti-reflection design of the pixel-based diaphragm of FIG. 2A.

FIG. 2B illustrates the principle of operation and an anti-reflection design of the pixel-based diaphragm of FIG. 2A. A light IL from the object OBS (referring to FIG. 1), which is substantially unpolarized, is incident on the pixel-based diaphragm 140. The pixel-based diaphragm 140 may filter or block a portion of the light IL, and allows a remaining portion of the light IL (referred to as light IL') to pass it self, such that the light IL' can be sent to the image sensor 130 (referring to FIG. 1). The optical film 149 manipulates an incident light IL into circular polarized light IP1 with a first circular polarization state (e.g., a left-hand circular polarization state). In some embodiments, a portion of the circularly polarized light IP1 may pass through the electrode layer E2, which the portion of the circularly polarized light IP1 may be referred to as the circularly polarized light IP2 hereinafter. When the circularly polarized light IP2 travels from the electrode layer E2 to the electrode layer E1 through the active medium layer 146, the circularly polarized light IP2 is further manipulated by the active medium layer 146. For forming the transmitting region, by applying voltages to the electrode layers E1 and E2 to achieve an electrically controlled birefringence (ECB) mode of the active medium layer 146, the active medium layer 146 has optical retardation of half wave. For example, the polarization of the circularly polarized light IP2 is transformed from the first circular polarization state (e.g., a left-hand circular polarization state) into the second circular polarized polarization state (e.g., a right-hand circular polarization state) by the active medium layer 146. Thus, the circularly polarized light IP2 with the second circular polarized polarization state (e.g., a right-hand circular polarization state) can pass through the optical film 148 as the light IL', which forming the transmitting region. For forming the opaque region, the electrode layers E1 and E2 may be controlled by applying voltages to make the active medium layer 146 has zero optical retardation, such that the circularly polarized light IP2 remains the first circular polarization state (e.g., the left-hand circular polarization state) and can not pass through the optical film 148.

In the first exemplary condition C1, when the circularly polarized light IP1 is reflected by the electrode layer E2, the polarization of the circularly polarized light IP1 is transformed from the first circular polarization state (e.g., a left-hand circular polarization state) into a second circular polarized polarization state (e.g., a right-hand circular polarization state). Thus, the circularly polarized light IP1 with the second circular polarized polarization state (e.g., a right-hand circular polarization state) is blocked by the optical film 149. The second circular polarized polarization state is conjugated with the first circular polarization state.

In the second exemplary condition C2, the circularly polarized light will be transformed three times to the conjugated polarization state: two by active medium layer 146 and one by the electrode layer E1. The reflected light also cannot pass through the optical film 149. For example, when the circularly polarized light IP2 is reflected by the electrode layer E1, the polarization of the circularly polarized light IP2 is transformed from the second circular polarization state (e.g., a right-hand circular polarization state) into the first circular polarization state (e.g., a left-hand circular polarization state). When the circularly polarized light IP2 travels from the electrode layer E1 to the electrode layer E2 through the active medium layer 146, the circularly polarized light IP2 is further manipulated by the active medium layer 146. For example, the polarization of the circularly polarized light IP2 is transformed from the first circular polarization state (e.g., a left-hand circular polarization state) into the second circular polarized polarization state (e.g., a right-hand circular polarization state) by the active medium layer 146. Then, the circularly polarized light IP2 with the second circular polarized polarization state (e.g., a right-hand circular polarization state) pass through the electrode layer E2, and can be blocked by the optical film 149. Through the configuration, light reflected by the electrode layers E1 and E2 are reduced.

FIGS. 2C-2F are top views of pixel-based diaphragms according to some embodiment of the disclosure. In FIG. 2C, each of the pixels 140P of the pixel-based diaphragm 140 can be designed to have a rectangular shape, such as a square shape, with a wavy edge, a curved edge, or a sinusoidal edge, such that the pixels 140P may adjoin with each other with wavy borders, curved borders, or sinusoidal borders. In FIG. 2D, each of the pixels 140P of the pixel-based diaphragm 140 can be designed to have a rectangular shape, such as a square shape, with a zigzag edge or saw-like edge, such that the pixels 140P may adjoin with each other with zigzag borders or saw-like borders. In FIG. 2E, each of the pixels 140P of the pixel-based diaphragm 140 can be designed to have a triangular shape. In FIG. 2F, each of the pixels 140P of the pixel-based diaphragm 140 can be designed to have a hexagonal shape. In some embodiments, the pixel shape of the pixels 140P of the pixel-based diaphragm 140 can be designed to decrease the impact of diffraction to the image. The pixel pattern diffracts the light into more azimuthal directions. The intensity of diffracted light is distributed into multiple directions. Hence, the deviated image caused by diffraction is less significant.

The pixels 140P may include irregular side in some other embodiments. In some embodiments, the pixel-based diaphragm 140 may have a black matrix surrounding edges of the pixels 140P. The black matrix can block the reflection of metal traces. In some other embodiments, the black matrix can be omitted from the pixel-based diaphragm 140.

In some embodiments, the point spread function of the pixel-based diaphragm 140 has a center peak intensity with the highest intensity. The second-high peak intensity is lower than 10% of the center peak intensity. And, for light from a point light source transmitting the pixel-based diaphragm 140, the diffracted light is distributed in more than 4 directions.

Figure 3C:
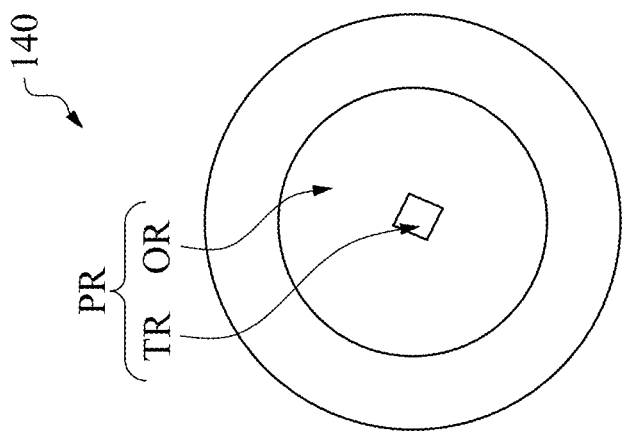
FIGS. 3A-3F illustrate various transmitting patterns of a pixel-based diaphragm under various operation modes according to some embodiment of the disclosure.
Figure 3B:
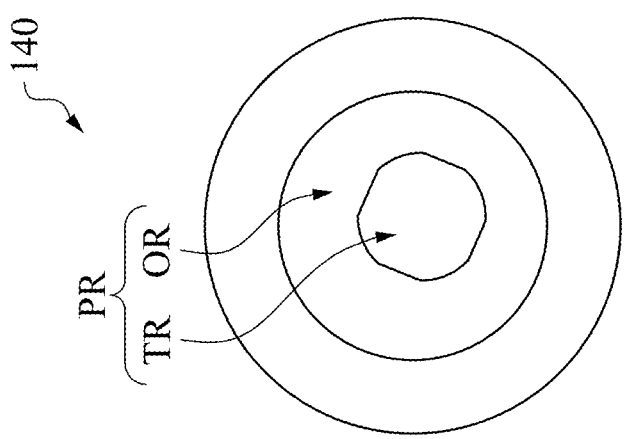
Figure 3A:
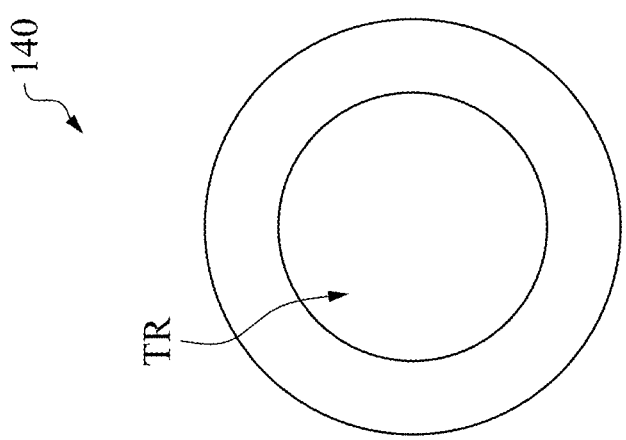
Figure 3F:
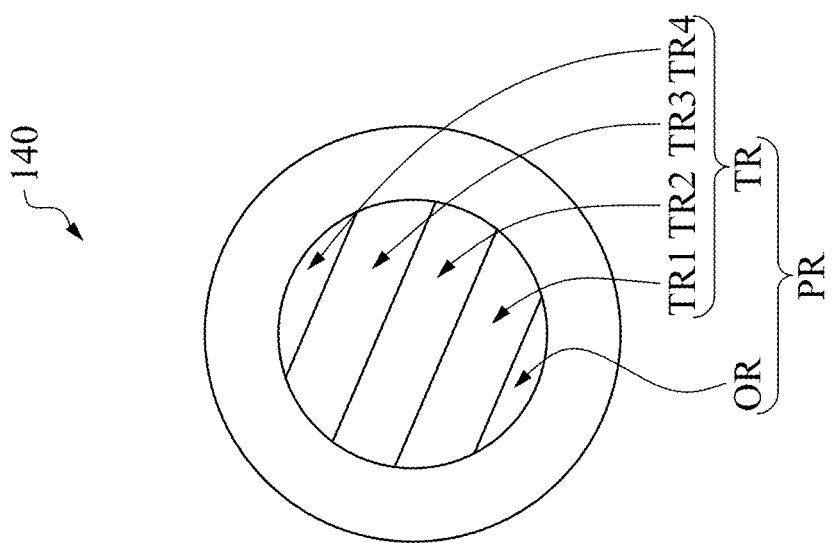
Figure 3E:
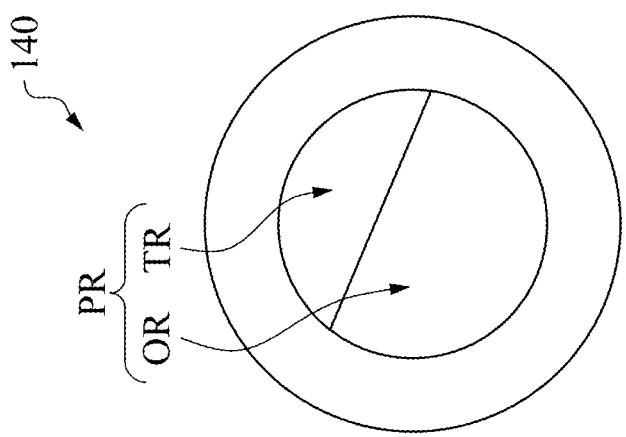
Figure 3D:
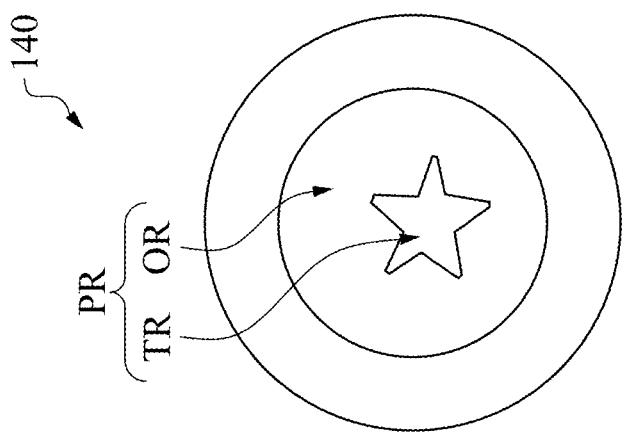

FIGS. 3A-3F illustrate various transmitting patterns of a pixel-based diaphragm 140 under various operation modes according to some embodiment of the disclosure. The pixel-based diaphragm 140 may have any suitable shape, such as circular, rectangular, diamond, oval, the like, or the combination thereof. FIGS. 3A-3C shows the pixel-based diaphragm 140 is controlled to have a light transmitting region/pattern TR with different sizes. For example, a radius/length/width of the circular light transmitting region/pattern TR in FIG. 3A is about 0.7 to about 1 times a radius/length/width of the pixel array region PR of the pixel-based diaphragm 140. A radius/length/width of the circular light transmitting region/pattern TR in FIG. 3B is about 0.3 to about 0.7 times a radius/length/width of the pixel array region PR of the pixel-based diaphragm 140. A radius/length/width of the circular light transmitting region/pattern TR in FIG. 3C is about 0.05 to about 0.3 times a radius/length/width of the pixel array region PR of the pixel-based diaphragm 140. FIGS. 3A and 3B show the pixel-based diaphragm 140 is controlled to have a circular light transmitting region/pattern TR. FIG. 3C shows the pixel-based diaphragm 140 is controlled to have a square light transmitting region/pattern TR. FIG. 3D shows the pixel-based diaphragm 140 is controlled to have a star-shaped light transmitting region/pattern TR. FIG. 3E shows the pixel-based diaphragm 140 is controlled to have a partial circular light transmitting region/pattern TR.

In FIG. 3F, the pixel-based diaphragm 140 controls the light transmittance thereof in 5 states to achieve gradient transmittance. For example, the light transmitting region/pattern TR has four sub-regions TR1-TR4 having different light transmittances. For example, the transmittance of the sub-regions TR1-TR4 are in a range from about 20% to about 50% and decreases in a sequence from the sub-region TR1 to the sub-region TR4. For example, the light transmittance of the sub-region TR1 is about 20%, the light transmittance of the sub-region TR2 is about 30%, the light transmittance of the sub-region TR3 is about 40%, and the light transmittance of the sub-region TR1 is about 45%. As aforementioned, the opaque region OR may have a transmittance below about 10% or even below 5%.

Figure 4:
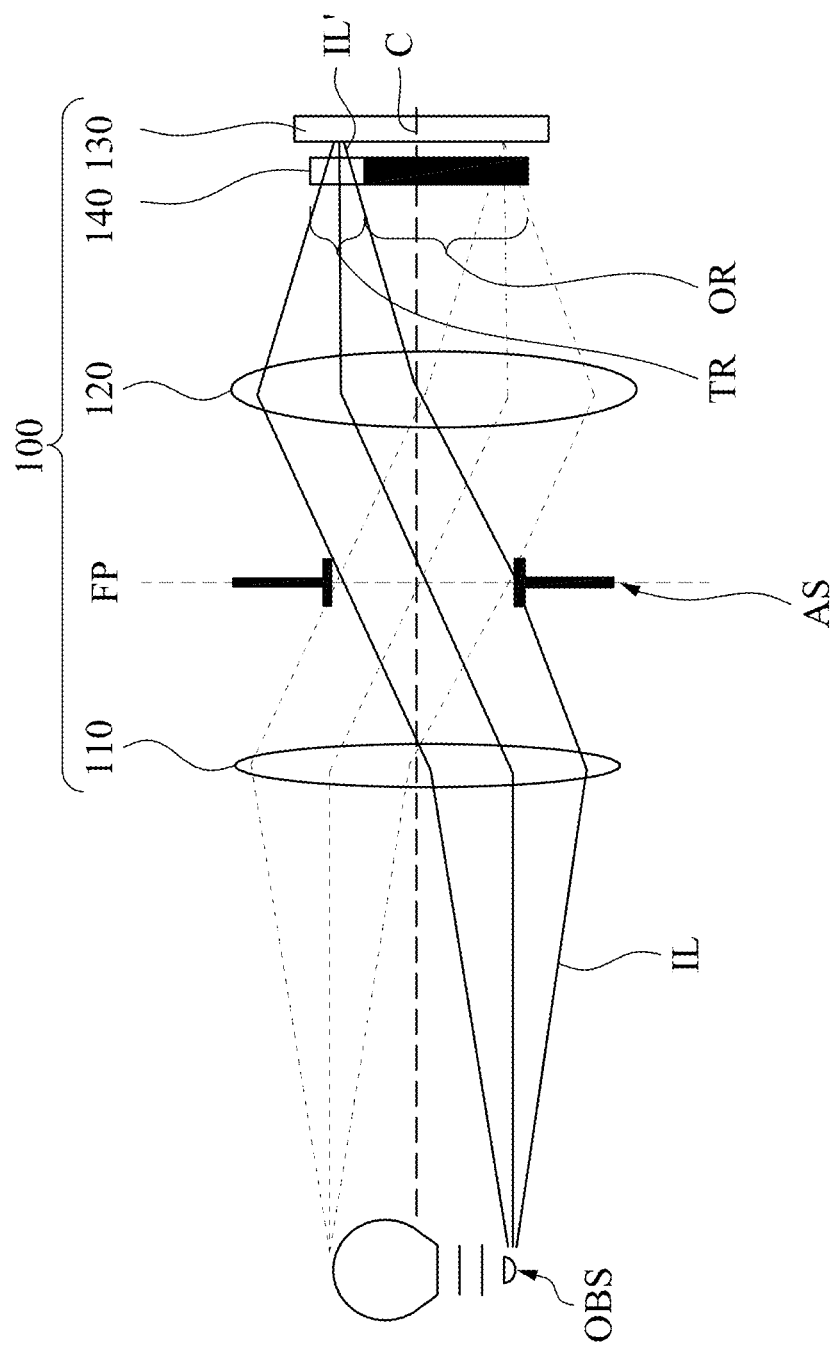
FIG. 4 is a schematic diagram of an optical imaging system according to some embodiment of the disclosure.

FIG. 4 is a schematic diagram of an optical imaging system 100 according to some embodiment of the disclosure. Details of the present embodiments are similar to those of FIG. 1, except that the pixel-based diaphragm 140 is disposed between the second lens component 120 and the image sensor 130. The pixel-based diaphragm 140 may be disposed just in front of the image sensor 130, thereby limiting the light from different regions of the scene/object OBS to the image sensor 130. The pixel-based diaphragm 140 may provide a spatial-type attenuation. The pixel-based diaphragm 140 may be closer to the image sensor 130 than to the first and second lens component 110 and 120.

Figure 5:
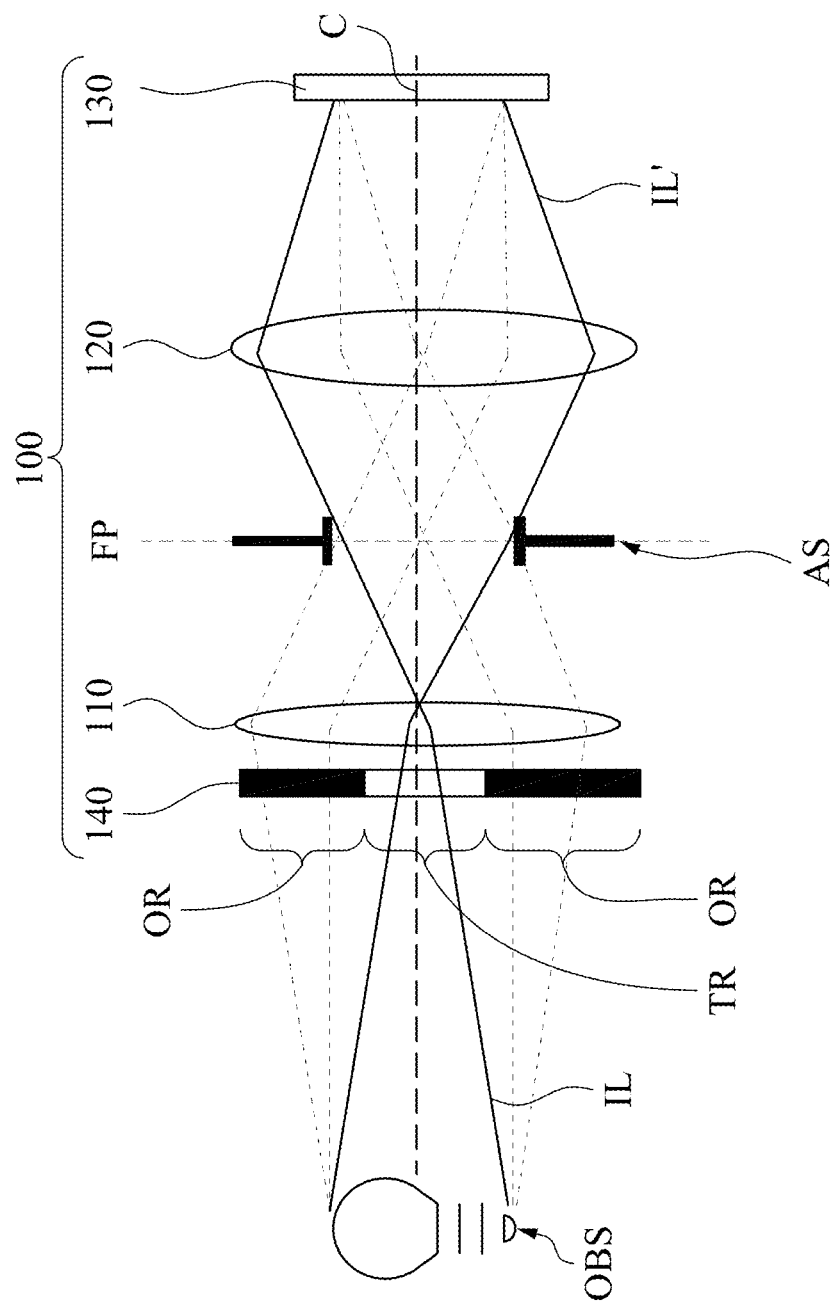
FIG. 5 is a schematic diagram of an optical imaging system according to some embodiment of the disclosure.

FIG. 5 is a schematic diagram of an optical imaging system 100 according to some embodiment of the disclosure. Details of the present embodiments are similar to those of FIG. 1, except that the pixel-based diaphragm 140 is disposed between the first lens component 110 and the scene/object OBS. The pixel-based diaphragm 140 may be closer to the first and second lens component 110 and 120 than to the object OBS. The pixel-based diaphragm 140 may provide a mixed-type attenuation including both the angular-type attenuation and the spatial-type attenuation. The positions of the pixel-based diaphragm 140 has been exemplarily shown in embodiments of FIGS. 1, 4, and 5. In some other embodiments, the pixel-based diaphragm 140 can be position at any suitable position of the optical imaging system 100 for achieving the desired angular-type attenuation and/or the desired spatial-type attenuation.

In photography, bokeh is the part of image that is out of focus. It is one of the features that photographers considering when taking a photo. The shape of pixel-based diaphragm 140 in an optical imaging system 100 affects the bokeh feature of the image. For example, a point light source in bokeh is hexagonal when the pixel-based diaphragm 140 has a hexagonal light transmitting region/pattern (e.g., hexagonal aperture). With the dynamically tunable pixel-based diaphragm 140, photographers can create a variety of unique bokeh feature.

Figure 6:
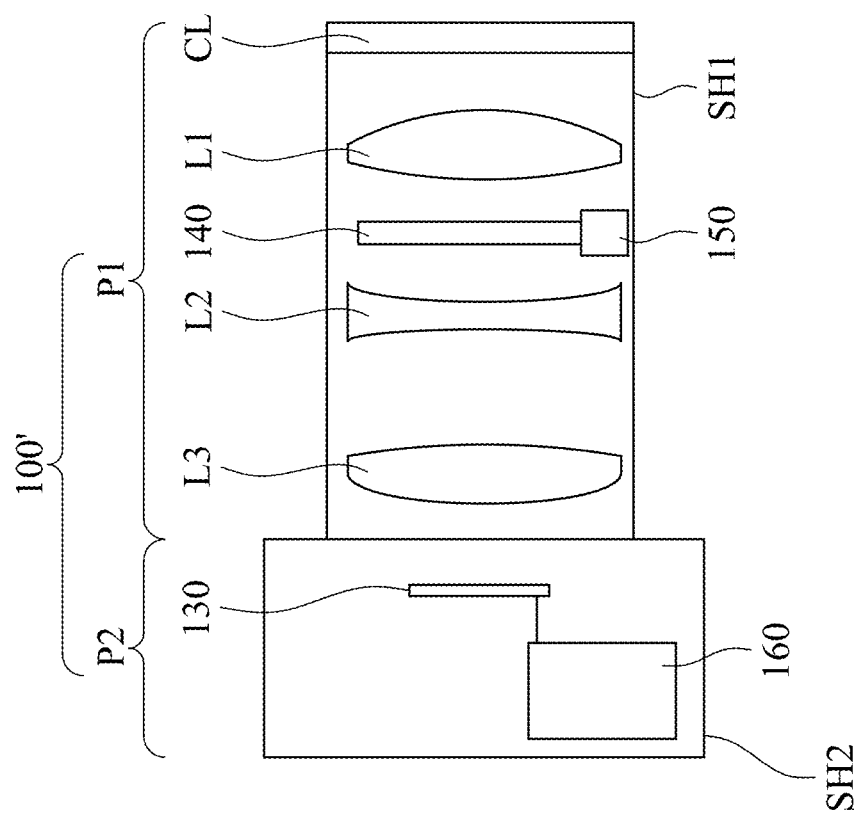
FIGS. 6-8 are schematic diagrams of optical imaging devices according to some embodiment of the disclosure.
Figure 7:
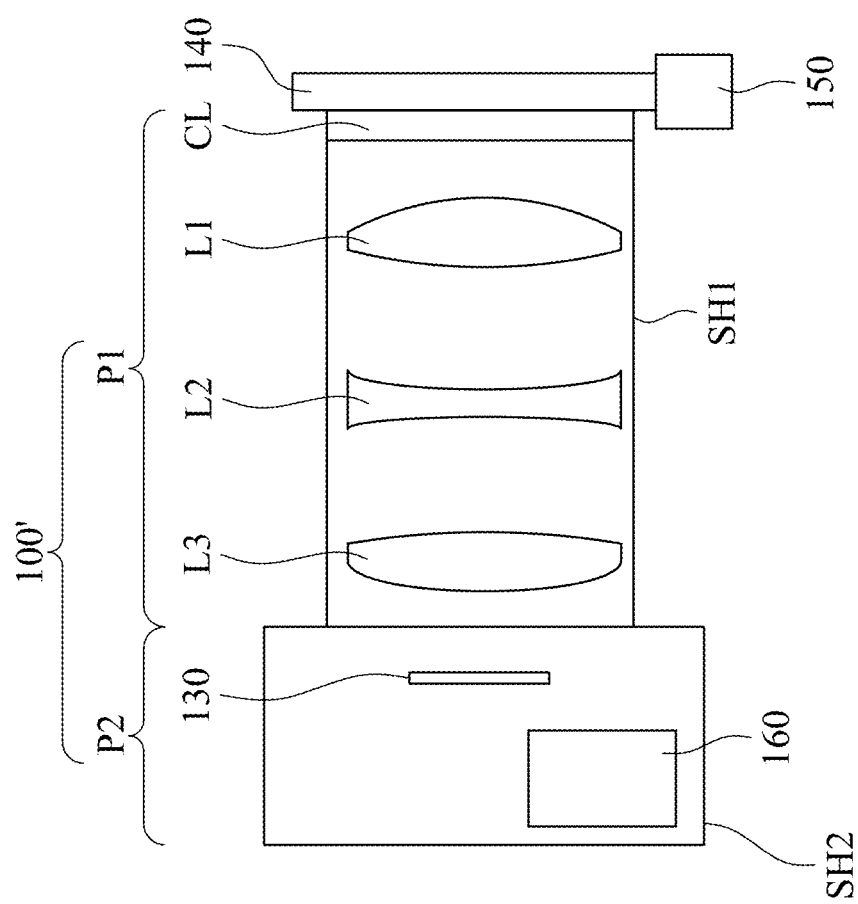
Figure 8:
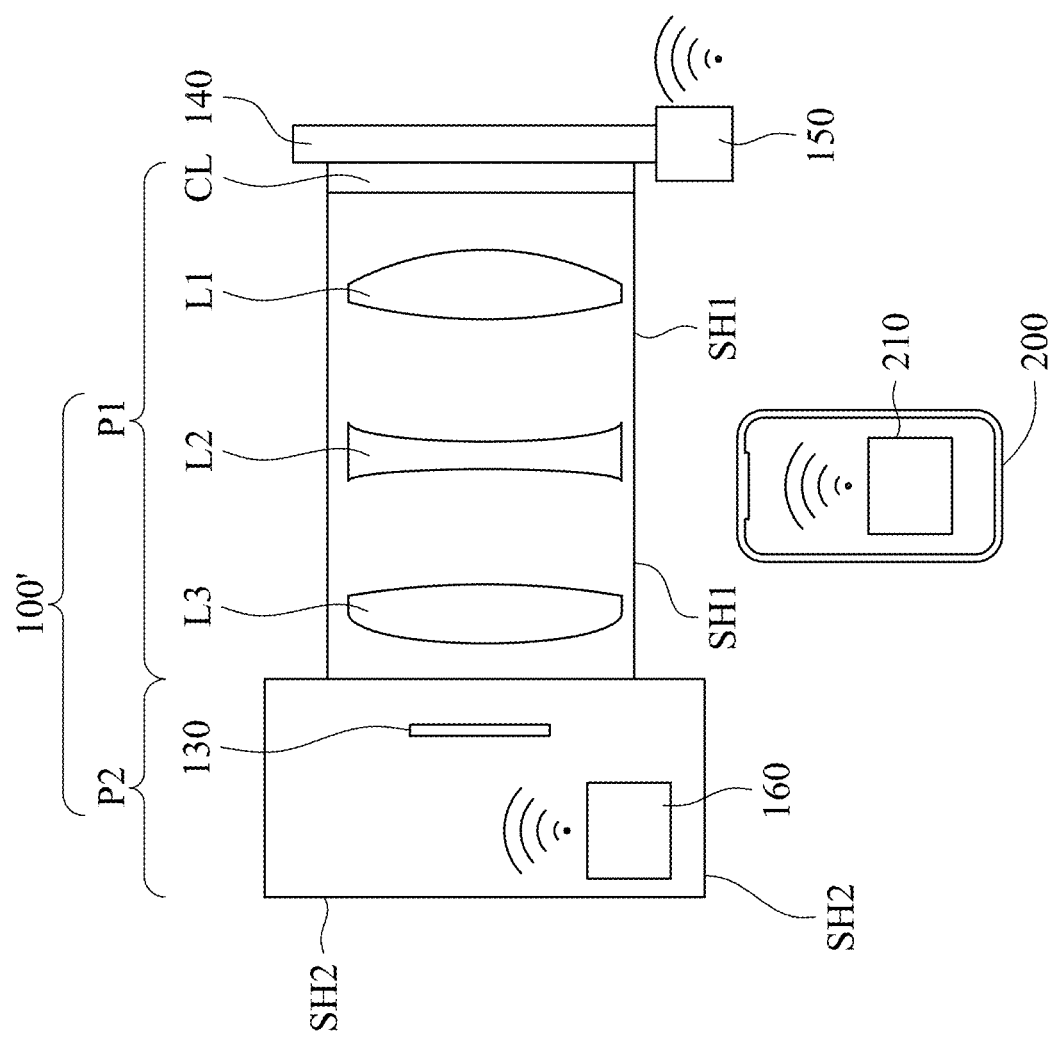

FIGS. 6-8 are schematic diagrams of optical imaging devices 100' according to some embodiment of the disclosure. The optical imaging device 100' may be a camera including a lens group portion P1 and an image sensing part P2, respectively surrounded by shells SH1 and SH2. The lens group portion P1 may be detachably mounted on the image sensing part P2. The shells SH1 and SH2 may be made of any suitable rigid material. The lens group portion P1 may include plural lens, such as lens L1-L3, surrounded by the shell SH1. The lens group portion P1 may have a cover lens CL at the front of the lens group portion P1 and in contact with the shell SH1. The image sensing part P2 may include the image sensor 130 and a built-in camera control system 160 surrounded by the shell SH2. The built-in camera control system 160 is electrically connected with the image sensor 130 for receiving the signals from the image sensor 130. The built-in camera control system 160 may be a digital camera system, computer, smart phone, or tablet. The optical imaging devices 100' may include the pixel-based diaphragm 140 and a diaphragm driving unit 150 electrically connected with the pixel-based diaphragm 140 for control the light transmitting pattern of the pixel-based diaphragm 140.

The diaphragm driving unit 150 may include a gate drive unit configured to provide at least a scan signal to the pixels 140P, a source drive unit configured to provide at least a data signal to the pixels 140P, a timing control unit electrically coupled to the source drive unit and configured to control the source drive unit to provide the data signal(s) (e.g., attenuation data), thereby making the pixel-based diaphragm 140 to execute a light transmitting pattern.

The built-in camera control system 160 may control the diaphragm driving unit 150 for adjusting/controlling the transmittance of each of the pixels 140P of the pixel-based diaphragm 140 and control the image sensor 130 to capture images at suitable timings. The built-in camera control system 160 may include a computer-readable storage medium and a processor coupled to the computer-readable storage medium. The computer-readable storage medium stores program that performs various steps of the methods in FIGS. 9A and 10A. The controller 260 controls the operations of the diaphragm driving unit 150 (or the pixel-based diaphragm 140) and the image sensor 130 by using the processor reading out and executing the program stored in the storage medium. The program may be one that has been stored in the computer-readable storage medium, or may be one that has been installed to the storage medium of the built-in camera control system 160.

In the embodiments of FIG. 6, the pixel-based diaphragm 140 is disposed in the lens group portion P1. The diaphragm driving unit 150 is electrically connected and electronically communicated with the built-in camera control system 160. Thus, a user can adjust the light transmitting pattern of the pixel-based diaphragm 140 through the built-in camera control system 160 in the optical imaging device 100'.

In the embodiments of FIG. 7, the pixel-based diaphragm 140 is detachably mounted on a front side of the lens group portion P1, detachably attached to a side of the cover lens CL and/or the shell SH1 facing away the shell SH2. The diaphragm driving unit 150 is electronically communicated with the built-in camera control system 160, for example, through electrical connection or wireless connection (e.g., Bluetooth, Wi-Fi, or Near-field communication (NFC)). Thus, a user can adjust the light transmitting pattern of the pixel-based diaphragm 140 through the built-in camera control system 160 in the optical imaging device 100'.

In the embodiments of FIG. 8, the pixel-based diaphragm 140 is detachably mounted on the front side of the lens group portion P1, for example, detachably attached to the cover lens CL and/or the shell SH1. An external control system 210 in an external device 200 (e.g., a mobile device, computer, smart phone, tablet) can be electronically communicated with the built-in camera control system 160 and the diaphragm driving unit 150, for example, through wireless connection. The external device 200 is external to the shells SH1 and SH2 of the optical imaging device 100'.

Through the configuration, the external control system 210 may control the diaphragm driving unit 150 for adjusting/controlling the transmittance of each of the pixels 140P of the pixel-based diaphragm 140 and control the built-in camera control system 160 to control the image sensor 130 to capture images at suitable timings. The external control system 210 may include a computer-readable storage medium and a processor coupled to the computer-readable storage medium. The computer-readable storage medium stores program that performs various steps of the methods in FIGS. 9A and 10A. The external control system 210 controls the operations of the diaphragm driving unit 150 (or the pixel-based diaphragm 140) and the built-in camera control system 160 (or the image sensor 130) by using the processor reading out and executing the program stored in the storage medium. The program may be one that has been stored in the computer-readable storage medium, or may be one that has been installed to the storage medium of the external control system 210. Thus, a user can adjust the light transmitting pattern of the pixel-based diaphragm 140 and control the image sensor 130 to capture images through the external control system 210 in the external device 200 (e.g., the mobile device). Other details of the embodiments of FIGS. 6-8 are similar to those illustrated above, and therefore not repeated herein.

Figure 9A:
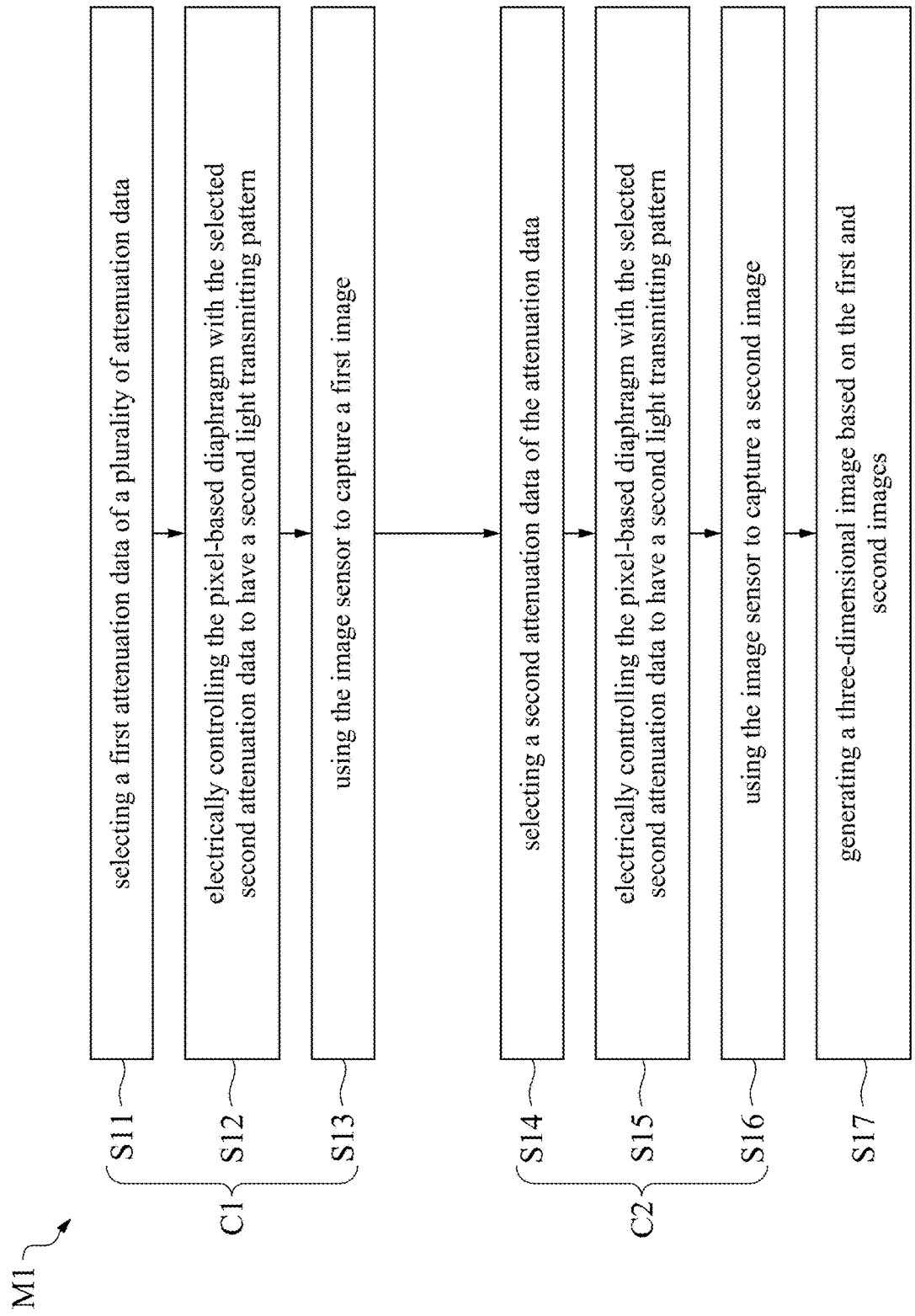
FIG. 9A is a flow chart of a method for operating one of the optical imaging devices of FIGS. 6-8.
Figure 9D:
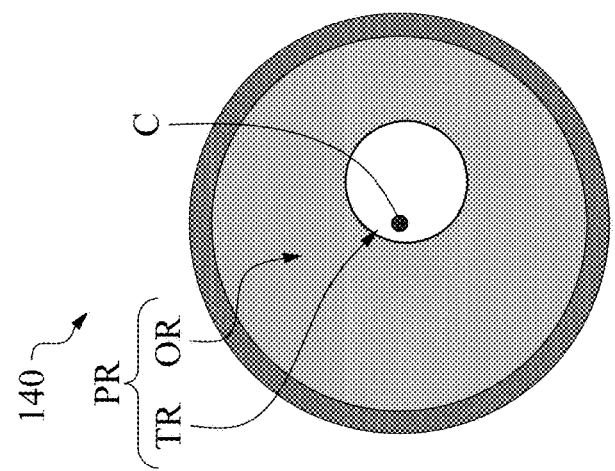
FIGS. 9B-9D illustrates various light transmitting patterns of a pixel-based diaphragm during the operation of said one of the optical imaging devices.
Figure 9C:
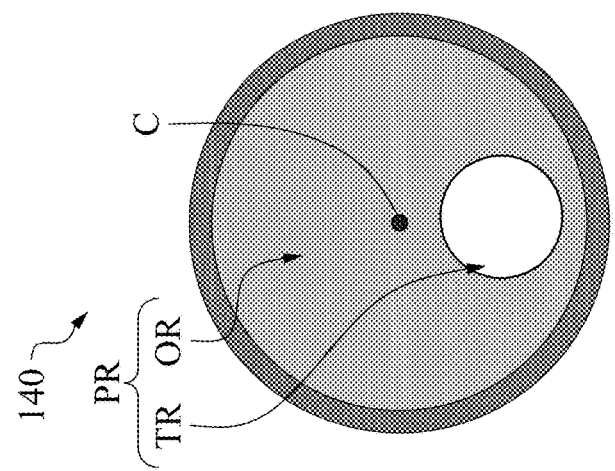
Figure 9B:
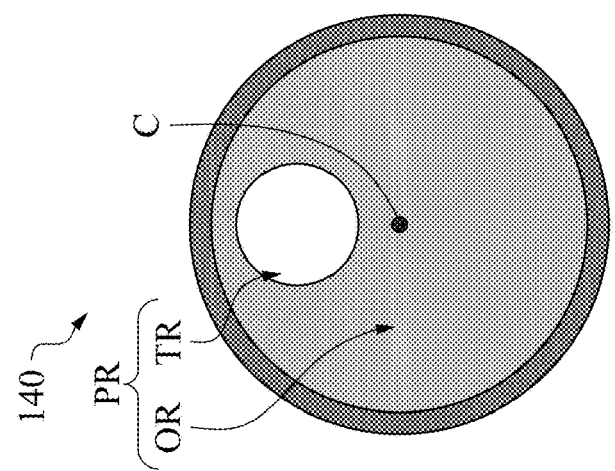

FIG. 9A is a flow chart of a method M1 for operating one of the optical imaging devices of FIGS. 6-8. The method M1 may include steps S11-S17. FIGS. 9B-9D illustrates various light transmitting patterns of a pixel-based diaphragm during the operation of said one of the optical imaging devices. It is understood that additional steps may be provided before, during, and after the steps S11-S17, and some of the steps described below can be replaced or eliminated for additional embodiments of the method. The order of the operations/processes may be interchangeable.

Since the transmittance of the liquid crystal panel depends on the incident angle of light, the attenuation is nonuniform among the field of view. To compensate the nonuniformity, the control system 160/210 may apply a correction look-up table while generating the attenuation data. The correction depends on the pixel position on panel, panel location in the optical imaging devices/systems, and FOV of optical imaging devices/systems.

At step S11, the control system 160/210 may select a first attenuation data of a plurality of attenuation data from the correction look-up table, and send the first attenuation data to the pixel-based diaphragm 140. At step S12, the pixel-based diaphragm 140 is electrically controlled and operated with the selected first attenuation data to have a first light transmitting pattern, for example, the light transmitting pattern TR in FIG. 9B. Then, at step S13, the image sensor 130 is used to capture a first image when the pixel-based diaphragm 140 has the first light transmitting pattern, for example, the light transmitting pattern TR in FIG. 9B.

At step S14, the control system 160/210 may select a second attenuation data of the plural attenuation data from the correction look-up table, and send the second attenuation data to the pixel-based diaphragm 140. At step S15, the pixel-based diaphragm is electrically controlled and operated with the selected second attenuation data to have a second light transmitting pattern, for example, the light transmitting pattern TR in FIG. 9C. The second attenuation data may be different from the first attenuation data, such that the second light transmitting pattern is different from the first light transmitting pattern. Then, at step S16, the image sensor 130 is used to capture a second image when the pixel-based diaphragm 140 has the second light transmitting pattern, for example, the light transmitting pattern TR in FIG. 9C.

In FIG. 9A, two cycles C1 and C2 are illustrated, in which each cycle includes a step of attenuation data selection, a step of operation of the pixel-based diaphragm, and a step of image capture. The cycle C1 is performed at a first time duration, and the cycle C2 is performed at a second time duration after the first time duration. Although merely two cycles are illustrated in FIG. 9A, one or more additional cycles may be performed. For example, after the cycles C1 and C2, a third cycle may be performed, in which the image sensor 130 is used to capture a third image when the pixel-based diaphragm 140 is operated with a third attenuation data to have a third light transmitting pattern, for example, the light transmitting pattern TR in FIG. 9D.

After these cycles, at step S17, the control system 160/210 may receive the first and second images, and generate a three-dimensional image based on the first and second images by suitable algorithms.

In some embodiments, the light transmitting patterns of the pixel-based diaphragm 140 (e.g., the light transmitting patterns TR in FIGS. 9B-9C) used in the method M1 may not overlap the optical axis C. In some embodiments, some of the light transmitting patterns of the pixel-based diaphragm 140 used in the method M1 (e.g., the light transmitting patterns TR in FIGS. 9B-9C) may not overlap the optical axis C, while others of the light transmitting patterns of the pixel-based diaphragm 140 (e.g., the light transmitting patterns TR in FIG. 9D) may overlap the optical axis C.

Figure 10A:
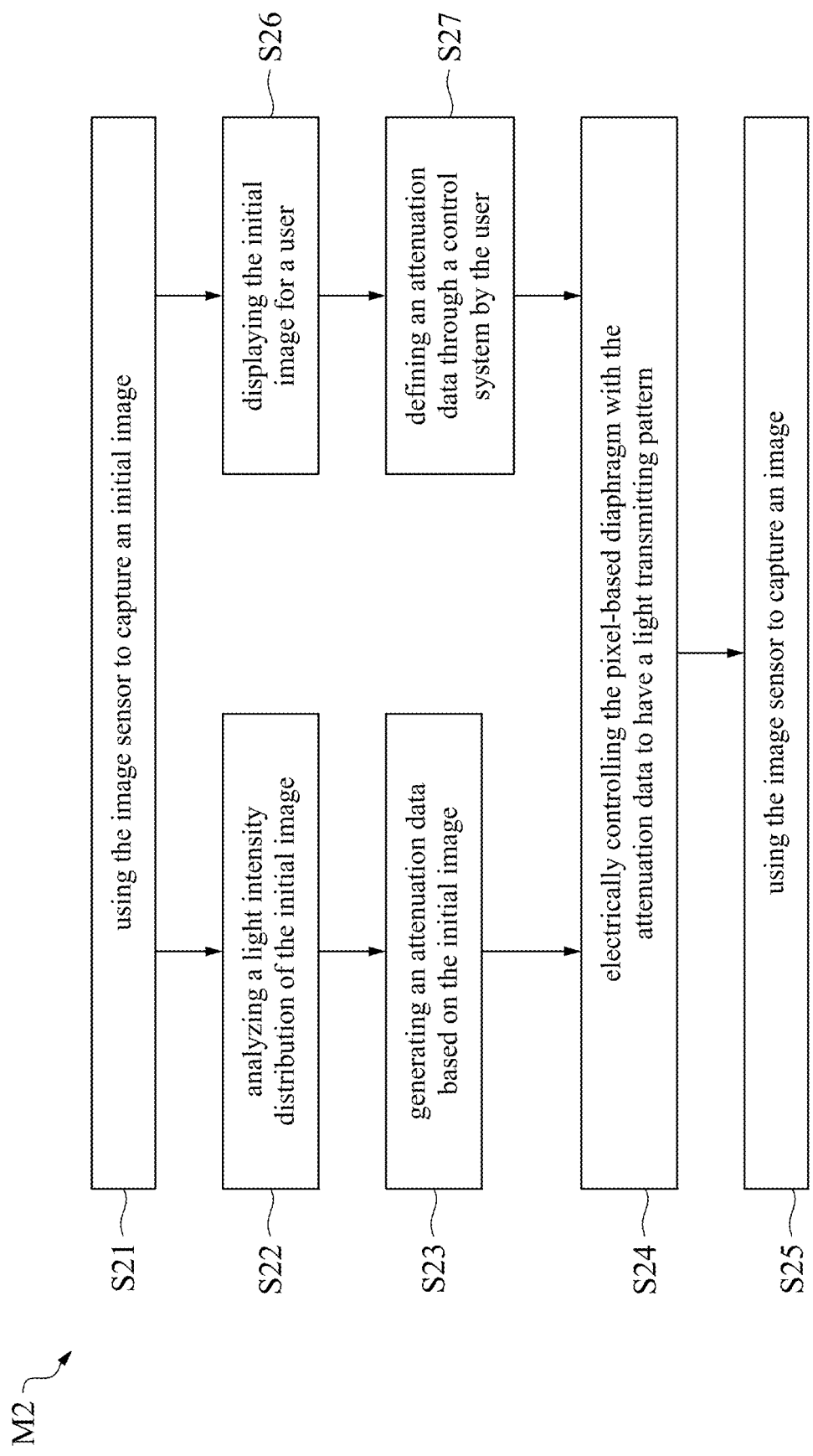
FIG. 10A is a flow chart of a method for operating one of the optical imaging devices of FIGS. 6-8.
Figure 10C:
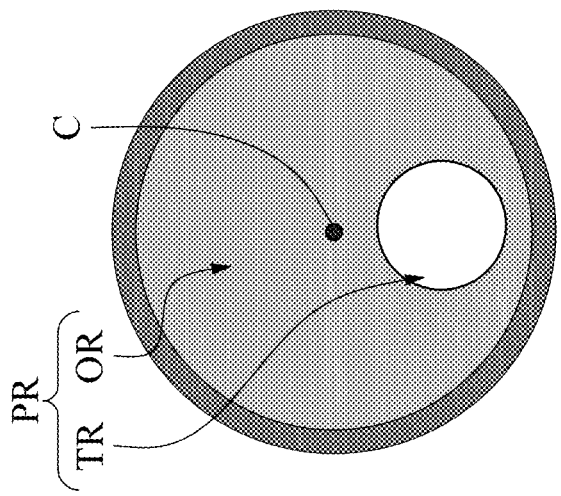
FIGS. 10B-10C illustrates various light transmitting patterns of a pixel-based diaphragm during the operation of said one of the optical imaging devices.
Figure 10B:
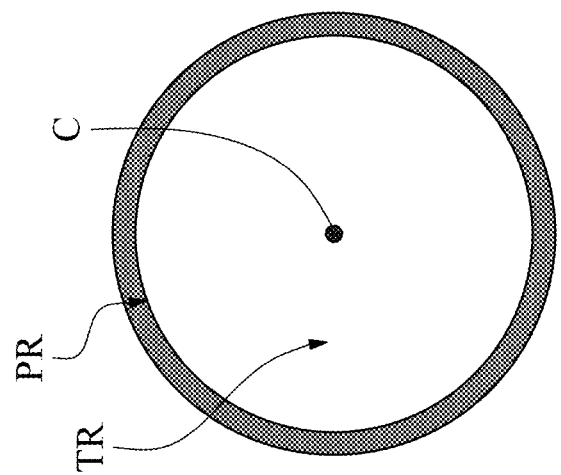

FIG. 10A is a flow chart of a method M2 for operating one of the optical imaging devices of FIGS. 6-8. FIGS. 10B-10C illustrates various light transmitting patterns of a pixel-based diaphragm during the operation of said one of the optical imaging devices. The method M2 includes steps S21-S27. It is understood that additional steps may be provided before, during, and after the steps S21-S27, and some of the steps described below can be replaced or eliminated for additional embodiments of the method. The order of the operations/processes may be interchangeable.

At step S21, the image sensor 130 is used to capture an initial image. At this stage, the pixel-based diaphragm 140 is operated with a fully transmitting pattern, for example, the light transmitting pattern TR in FIG. 10B.

At step S22, the control system 160/210 may receive the initial image and analyze the light intensity distribution of the initial image.

At step S23, the control system 160/210 may generate an attenuation data by optimizing an exposure condition based the initial image through suitable algorithms. The control system 160/210 may send the generated attenuation data to the pixel-based diaphragm 140.

At step S24, the pixel-based diaphragm 140 is electrically controlled and operated with the attenuation data to have a light transmitting pattern, for example, the light transmitting pattern TR in FIG. 10C.

At step S25, the image sensor 130 is used to capture an image when the pixel-based diaphragm 140 has the light transmitting pattern, for example, the light transmitting pattern TR in FIG. 10C. Through the configuration, the image can be captured by the image sensor 130 with an optimized/ideal exposure condition.

In some alternative embodiments, after step S21, the method M2 proceeds to the step S26 where the initial image is displayed (e.g., on a screen) for a user. The method M2 then proceeds to the step S26 where the user can define an attenuation data or select an attenuation data in a database (e.g., correction look-up table) through the control system 160/210 after the user see/know the initial image. The method may then proceed to the step S24, where the pixel-based diaphragm 140 is electrically controlled and operated with the attenuation data to have a light transmitting pattern, for example, the light transmitting pattern TR in FIG. 10C. The method may then proceed to the step S25, where the image sensor 130 is used to capture an image when the pixel-based diaphragm 140 has the light transmitting pattern, for example, the light transmitting pattern TR in FIG. 10C. Through the configuration, the exposure condition for the image can be improved.

Figure 11:
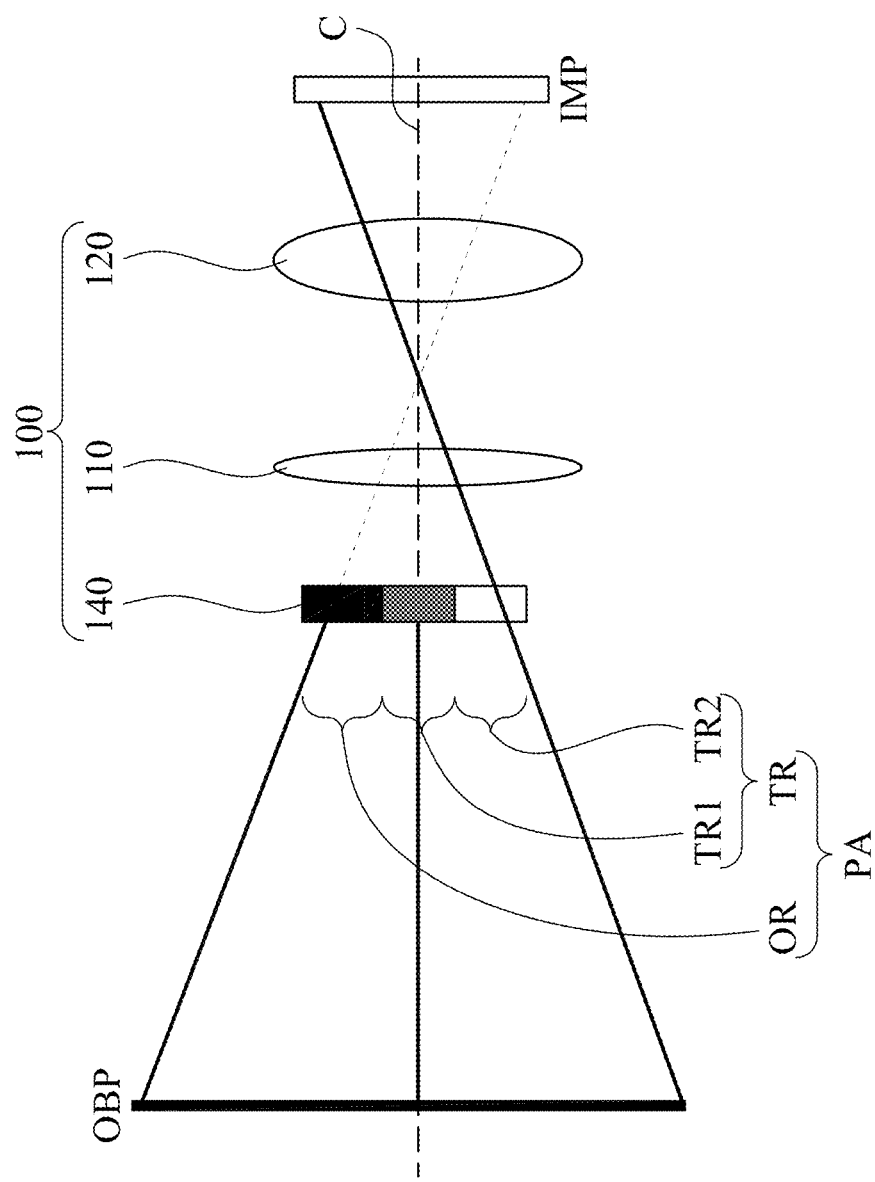
FIG. 11 is a schematic diagram of an optical imaging system according to some embodiment of the disclosure.

FIG. 11 is a schematic diagram of an optical imaging system 100 according to some embodiment of the disclosure. The optical imaging system 100 may include the first lens component 110 and the second lens component 120 for projecting light from an object plane OBP to an image plane IMP. An image sensor (e.g., the image sensor 130) may be disposed at the image plane IMP for capturing the image of the object at the object plane OBP. The pixel-based diaphragm 140 is disposed at any position in the optical imaging system 100 for provide an angular-type attenuation, a spatial-type attenuation, or the combination thereof.

In the present embodiments, the pixel-based diaphragm 140 controls the light transmittance thereof in 3 states to achieve various shapes of the light transmitting region/pattern TR in the pixel array region PR. The light transmitting region/pattern TR of the pixel-based diaphragm 140 may have at least two sub-regions TR1 and TR2 having different light transmittances. The transmittance of the sub-region TR1 is lower than the transmittance of the sub-region TR2.

In some cases, without the pixel-based diaphragm 140, an image of the object at the object plane OBP may be captured with an unsatisfied exposure condition since the pixel-based diaphragm 140 has a limited dynamic range. For example, a high-light part of the image may be over exposed, while a low-light part of the image under exposed.

In some embodiments of the present disclosure, the pixel-based diaphragm can serve as a black card locally blocking a portion of the light during the exposure time. In some embodiments, with the presence of the pixel-based diaphragm 140, the high-light part and the low-light part of the image are both correctly exposed in one single exposure/shot condition. For example, within a single shot, the brightness of over-exposure part is attenuated to adapt to the dynamic range of the sensor. As a result, the exposure condition of the image can be locally optimized, which is beneficial for capture images of high-dynamic range scene.

Figure 12:
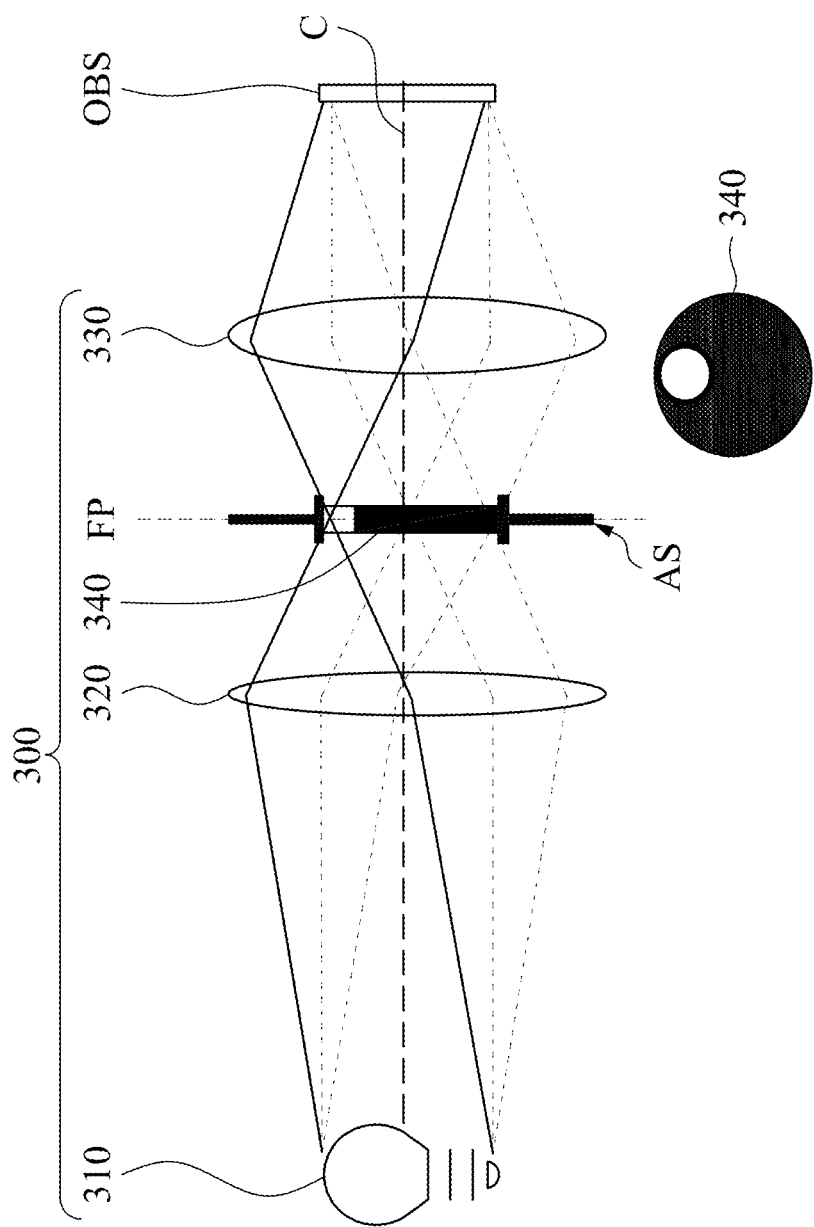
FIG. 12 is a schematic diagram of an optical illuminating system according to some embodiment of the disclosure.

FIG. 12 is a schematic diagram of an optical illuminating system 300 according to some embodiment of the disclosure. The optical illuminating system 300 include a light source 310, a first lens component 320, a second lens component 330, and a pixel-based diaphragm 340 placed along an optical axis C' of the optical illuminating system 300. The light source 310 provide light to the first lens component 320. The first lens component 320 directs the light to the second lens component 330. The second lens component 330 directs the light to an object OBS. Each of the first lens component 320 and the second lens component 330 may be formed by a single lens or formed by a plurality of lenses. FIG. 12 shows a single-lens configuration for the first lens component 320 and a single-lens configuration for the second lens component 330.

In some embodiments, the first lens component 320 is conjugated with the second lens component 330. For example, the first lens component 320 has a focal plane at a same position as a focal plane of the second lens component 330. The focal planes of the first lens component 320 and the second lens component 330 can be considered as a focal plane FP of the lens group. In some embodiments, the position of the focal plane FP of the lens group is referred to as an aperture stop AS of the entire optical illuminating system 300. In some embodiments, the first lens component 320 is not conjugated with the second lens component 330. For example, the focal plane of the first lens component 320 is spaced from the focal plane of the second lens component 330.

In some embodiments of the present disclosure, the pixel-based diaphragm 340 is optically coupled between the first lens component 320 and the second lens component 330, which can be conjugated with each other or not. For example, the pixel-based diaphragm 340 is disposed at the aperture stop AS of the entire optical illuminating system 300 between the first lens component 320 and the second lens component 330, thereby limiting the angle of the light from the light source 310 to the object OBS. With the images taken with different illumination angles, more optical information, such as optical phase and light field of the object OBS, can be reconstructed. The pixel-based diaphragm 140 may provide an angular-type attenuation.

In some other embodiments, the pixel-based diaphragm 340 is disposed between the first lens component 320 and the light source 310. Alternatively, in some other embodiments, the pixel-based diaphragm 340 is disposed between the second lens component 330 and the object OBS. A structure of the pixel-based diaphragm 340 may be the same as those illustrated with the pixel-based diaphragm 140. Other details of the present embodiments are similar to those illustrated above, and thereto not repeated herein.

Figure 13A:
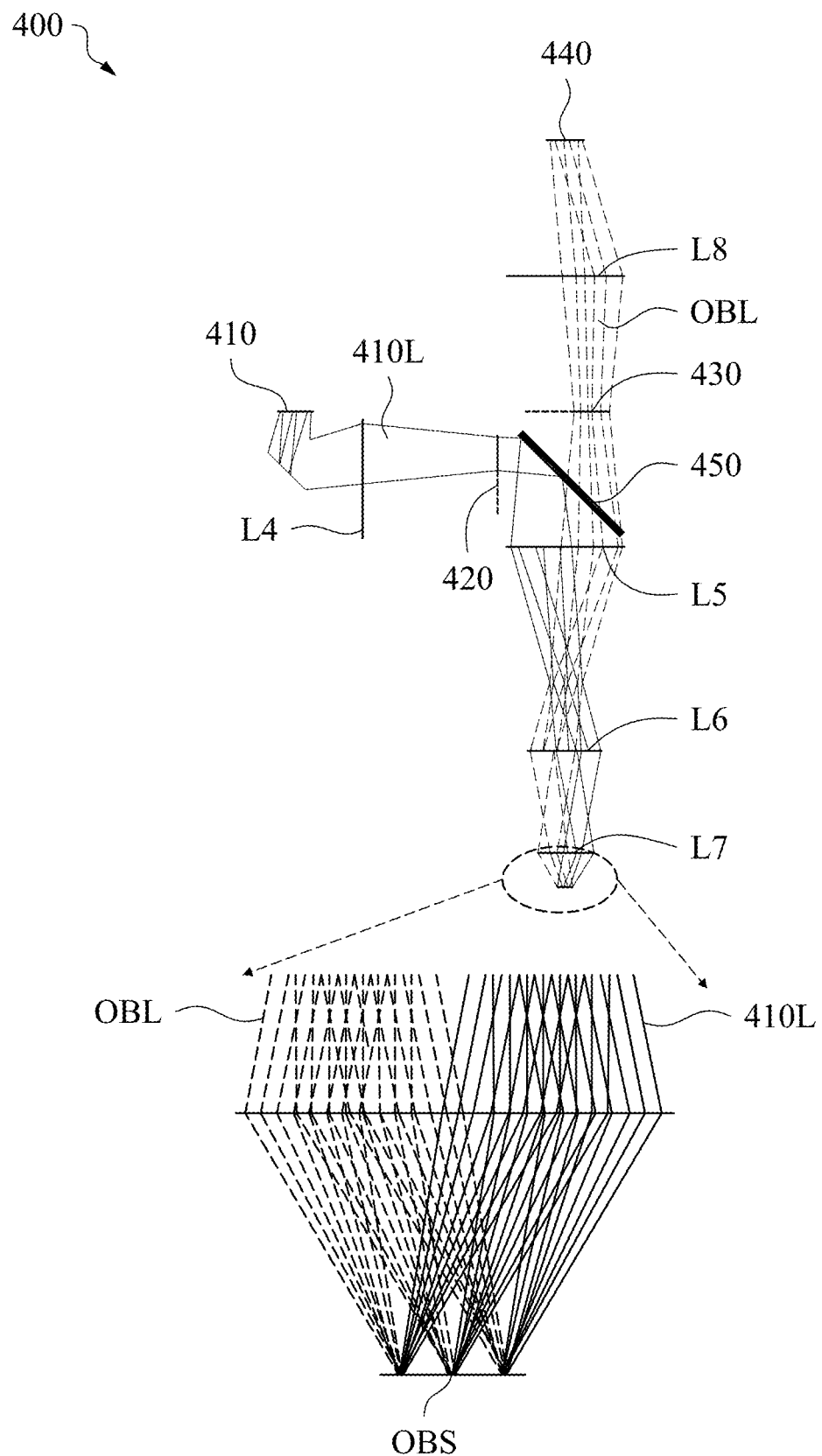
FIGS. 13A-13C show a schematic diagram of an optical microscope system under different cycles according to some embodiment of the disclosure.
Figure 13B:
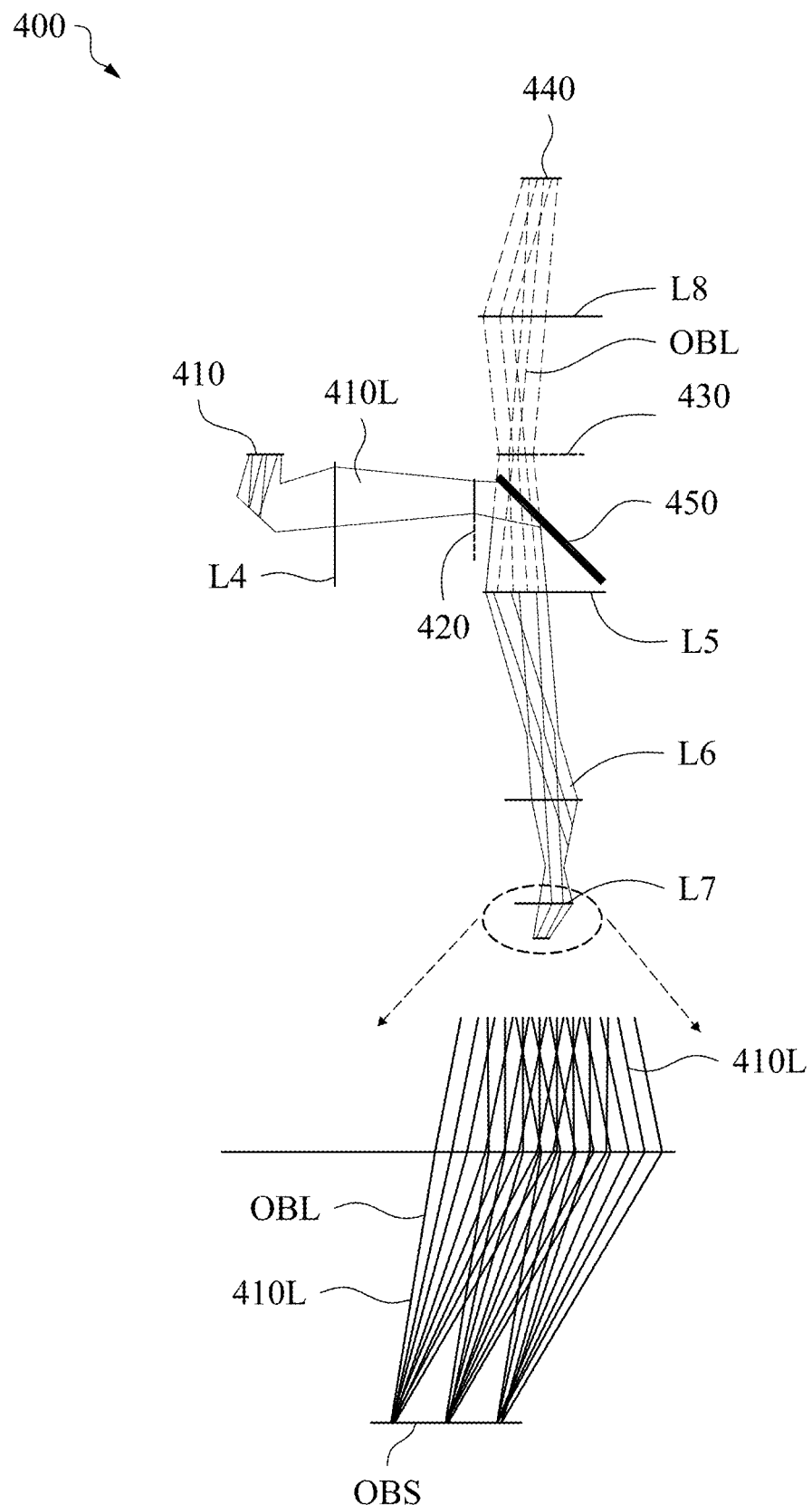
Figure 13C:
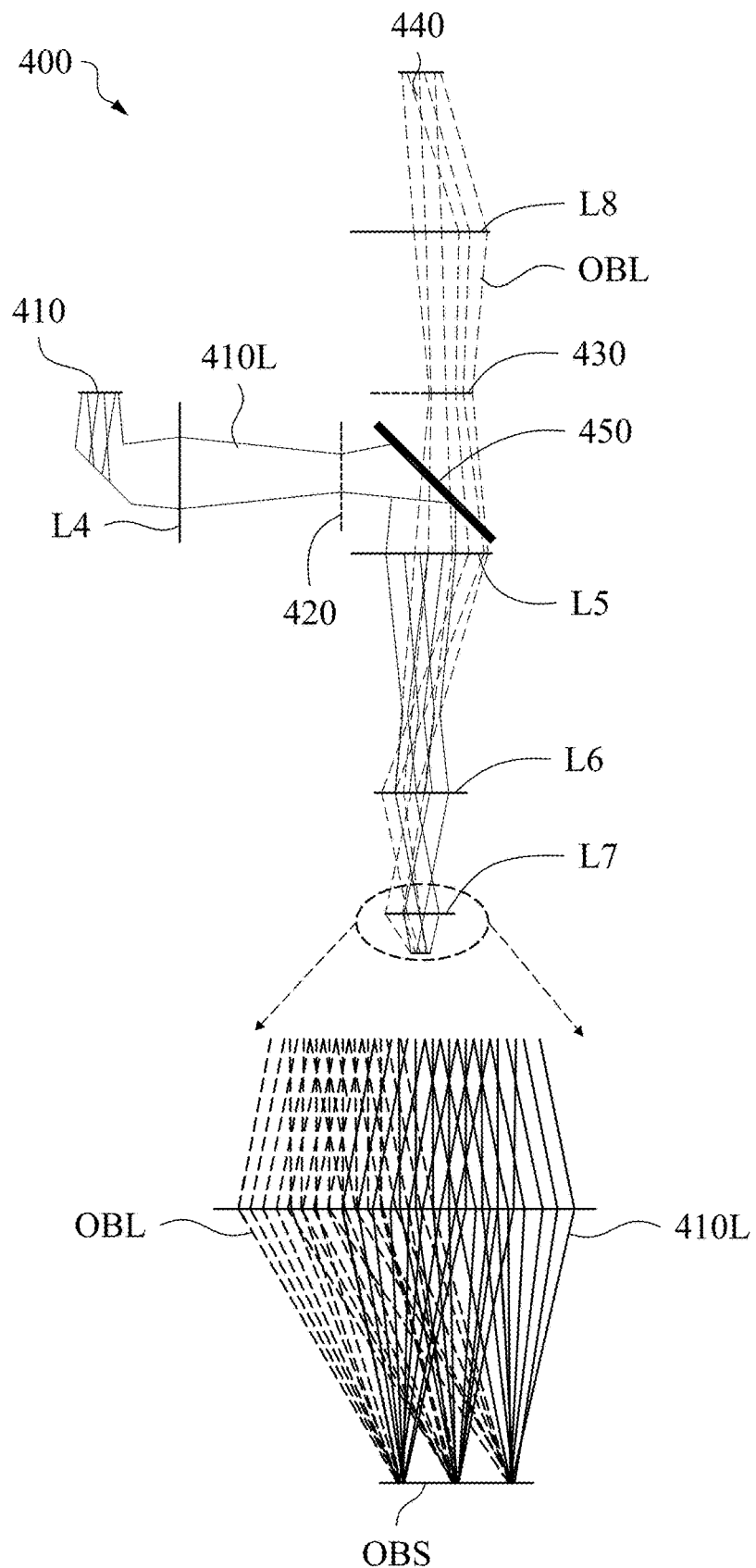

FIGS. 13A-13C show a schematic diagram of an optical microscope system 400 under different cycles according to some embodiment of the disclosure. The optical microscope system 400 may include a light source 410, a pixel-based diaphragm 420, a pixel-based diaphragm 430, an image sensor 440, lens L1-L8, and a beam combiner 450. The light source 410 provide light 410L to an object (or specimen) OBS through the lens L4-L7, the object (or specimen) OBS reflects the light 410L (denoted as light OBS hereinafter) to the image sensor 440 through the lens L5-L8. The beam combiner 450 may combine a light path from the light source 410 to the object OBS (referred to as an optical illuminating path/system) with the light path from the object OBS to the image sensor 440 (referred to as an optical imaging path/system). Through the configuration, an optic axis of the optical illuminating path/system may at least partially overlap an optic axis of the optical imaging path/system. For example, the light path from the light source 410 to the object OBS share the lens L5-L7 with the light path from the object OBS to the image sensor 440.

One or more pixelated tunable diaphragms (e.g., pixel-based diaphragms 420 and 430) are applied both in the optical illuminating path/system and optical imaging path/system separately. The tunable diaphragm controls the light transporting angle of imaging and illumination. Structure of the pixel-based diaphragms 420 and 430 may be the same as those illustrated with the pixel-based diaphragm 140. In some embodiments of the present disclosure, the pixel-based diaphragm 420 may be disposed between the lens L4 and L5, and the pixel-based diaphragm 430 may be disposed between the lens L5 and L8. For example, the pixel-based diaphragm 420 may be disposed between the lens L4 and the beam combiner 450, and the pixel-based diaphragm 430 may be disposed between the beam combiner 450 and the lens L8. The pixel-based diaphragm 420 may provide an angular-type attenuation. The pixel-based diaphragm 430 may provide an angular-type attenuation, a spatial-type attenuation, or the combination thereof.

In some embodiments, the lens L4 is conjugated with the lens L5 (e.g., focal planes of the lens L4 and lens L5 being at a same position), and the pixel-based diaphragm 420 is disposed at the focal planes of the lens L4 and lens L5. In some embodiments, the lens L5 is conjugated with the lens L8 (e.g., focal planes of the lens L5 and lens L8 being at a same position), and the pixel-based diaphragm 430 is disposed at the focal planes of the lens L5 and lens L8. In some alternative embodiments, the lens L4 may not be conjugated with the lens L5 (e.g., the focal planes of the lens L4 and lens L5 being at different positions), and the pixel-based diaphragm 420 is optically coupled between the lens L4 and lens L5. In some alternative embodiments, the lens L5 may not be conjugated with the lens L8 (e.g., focal planes of the lens L5 and lens L8 being at different positions), and the pixel-based diaphragm 430 is optically coupled between the lens L5 and lens L8.

The pixel-based diaphragm 420 can control the illumination angles of light 410L impinging on the object OBS, and the pixel-based diaphragm 430 can control the angles of light OBL from the object OBS. With the images taken with different illumination angles of the light 410L and different angles of the light OBL, more optical information, such as optical phase and light field of the object OBS, can be reconstructed. At least one of the pixel-based diaphragm 420 and the pixel-based diaphragm 430 in FIGS. 13A-13C is operated in different modes.

Like the method M1 shown in FIG. 9A, in FIG. 13A, the optical microscope system 400 is operated under three different cycles, respectively in FIGS. 13A-13C.

At a first cycle in FIG. 13A, a control system (e.g., the aforementioned control system 160/210) may select a first illuminating attenuation data and a first sensing attenuation data, like the step S11 in FIG. 9A. The control system electrically controls the pixel-based diaphragm 420 with the first illuminating attenuation data to have a first illuminating light transmitting region/pattern, and control the pixel-based diaphragm 420 with the first sensing attenuation data to have a first sensing light transmitting region/pattern. Then, the image sensor 440 capture a first image.

At a second cycle in FIG. 13B, a control system (e.g., the aforementioned control system 160/210) may select a second illuminating attenuation data and a second sensing attenuation data, like the step S14 in FIG. 9A. The control system electrically control the pixel-based diaphragm 420 with the second illuminating attenuation data to have a second illuminating light transmitting region/pattern, and control the pixel-based diaphragm 420 with the second sensing attenuation data to have a second sensing light transmitting region/pattern. Then, the image sensor 440 capture a second image.

At a second cycle in FIG. 13B, a control system (e.g., the aforementioned control system 160/210) may select a second illuminating attenuation data and a second sensing attenuation data, like the step S14 in FIG. 9A. The control system electrically controls the pixel-based diaphragm 420 with the second illuminating attenuation data to have a second illuminating light transmitting region/pattern, and control the pixel-based diaphragm 420 with the second sensing attenuation data to have a second sensing light transmitting region/pattern. Then, the image sensor 440 capture a second image.

At a third cycle in FIG. 13C, a control system (e.g., the aforementioned control system 160/210) may select a third illuminating attenuation data and a third sensing attenuation data. The control system electrically controls the pixel-based diaphragm 420 with the third illuminating attenuation data to have a third illuminating light transmitting region/pattern, and control the pixel-based diaphragm 420 with the third sensing attenuation data to have a third sensing light transmitting region/pattern. Then, the image sensor 440 capture a third image.

In FIGS. 13A-13C, for the optical illuminating path/system, the first illuminating attenuation data is substantially the same as the second illuminating attenuation data but different from the third illuminating attenuation data. As a result, the first illuminating light transmitting region/pattern of the pixel-based diaphragm 420 in FIG. 13A is substantially the same as the second illuminating light transmitting region/pattern of the pixel-based diaphragm 420 in FIG. 13B and different from the third illuminating light transmitting region/pattern of the pixel-based diaphragm 420 in FIG. 13C.

In FIGS. 13A-13C, for the optical imaging path/system, the first sensing attenuation data is different from the second sensing attenuation data, but substantially the same as the third sensing attenuation data. As a result, the first sensing light transmitting region/pattern of the pixel-based diaphragm 430 in FIG. 13A is different from the second sensing light transmitting region/pattern of the pixel-based diaphragm 430 in FIG. 13B, but the same as the third sensing light transmitting region/pattern of the pixel-based diaphragm 430 in FIG. 13C.

Although the first to third illuminating light transmitting regions/patterns of the pixel-based diaphragm 420 and the first to third sensing light transmitting regions/patterns of the pixel-based diaphragm 430 are exemplarily shown in FIGS. 13A-13C, it should not limit the scope of the present disclosure. In some other embodiments, the first to third illuminating light transmitting regions/patterns of the pixel-based diaphragm 420 may be different from each other, and the first to third sensing light transmitting regions/patterns of the pixel-based diaphragm 430 may be different from each other. The number of the cycles can be more than the illustrated three cycles, not limited to the illustrated cycles in FIGS. 13A-13C.

By analyzing the first to third images with different light transporting angle condition (e.g., the first to third illuminating attenuation data and the first to third sensing attenuation data), the control system (e.g., the aforementioned control system 160/210) may generate optical information of the object OBS, such as optical phase, light field, 3D structure, motion, or polarization, based on the first to third images by suitable algorithms. Other details of the present embodiments are similar to those illustrated above, and thereto not repeated herein.

Based on the above discussions, it can be seen that the present disclosure offers advantages. It is understood, however, that other embodiments may offer additional advantages, and not all advantages are necessarily disclosed herein, and that no particular advantage is required for all embodiments. One advantage is that an optical system is integrated with a pixel-based liquid crystal panel as a tunable diaphragm. The transmittance of each pixel is locally controlled with thin film transistors. With the pixel-based liquid crystal panel, the pupil of the diaphragm has more flexibility in size, location, shape, and transmittance. Another advantage is that the pixel-based tunable diaphragm provides the imaging system more functions: designable bokeh feature, dynamic black card and dynamic illumination angle.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical system, comprising:
a light-receiving plane;
a lens group configured to direct an incident light to the light receiving plane;
a pixel-based diaphragm at an aperture stop of the lens group, wherein the pixel-based diaphragm comprises:
a first substrate coated with pixelated electrodes;
a second substrate coated with an electrode; and
an active medium layer between the first substrate and the second substrate; and
a driving unit electrically coupled with the pixel-based diaphragm and configured to control the pixel-based diaphragm to have a first light transmitting pattern at a first time duration and a second light transmitting pattern at a second time duration, wherein the first light transmitting pattern is different from the second light transmitting pattern.

2. The optical system of claim 1, wherein the lens group comprises a first lens and a second lens, and the pixel-based diaphragm is between the first lens and the second lens.

3. The optical system of claim 1, wherein the pixel-based diaphragm comprises at least one polarizer.

4. The optical system of claim 3, wherein the polarizer is a circular polarizer on a side of the active medium layer facing the incident light.

5. The optical system of claim 1, wherein the first light transmitting pattern is a transmitting region on an optical axis of the optical system.

6. The optical system of claim 1, wherein the first light transmitting pattern is a transmitting region spaced apart from an optical axis of the optical system.

7. The optical system of claim 1, wherein the first light transmitting pattern has a first transmitting region, a second transmitting region, and a third transmitting region, the second transmitting region is between the first and third transmitting regions, and a transmittance of the first light transmitting pattern decreases from the first transmitting region to the third transmitting region.

8. The optical system of claim 1, further comprising:
an image sensor at the light-receiving plane; and
a controller electrically coupled with the driving unit and the image sensor, wherein the image sensor is configured to capture a first image at the first time duration and capture a second image at the second time duration, and the controller is configured to generate a three-dimensional image based on the first and second images.

9. An optical system, comprising:
a light-receiving plane;
a lens group configured to direct an incident light to the light-receiving plane;
a pixel-based diaphragm in front of the light-receiving plane towards the incident light, wherein the pixel-based diaphragm locates on a first side of a aperture stop of the lens group facing the light-receiving plane or on a second side of the aperture stop of the lens group facing away from the light-receiving plane, wherein the pixel-based diaphragm comprises:
a first substrate coated with pixelated electrodes;
a second substrate coated with an electrode; and
an active medium layer between the first substrate and the second substrate; and
a driving unit electrically coupled with the pixel-based diaphragm and configured to control the pixel-based diaphragm to have a first light transmitting pattern at a first time duration and a second light transmitting pattern at a second time duration, wherein the first light transmitting pattern is different from the second light transmitting pattern.

10. The optical system of claim 9, wherein the lens group comprises a first lens and a second lens, and the pixel-based diaphragm is between the first lens and the second lens.

11. The optical system of claim 9, wherein the pixel-based diaphragm comprises at least one polarizer.

12. The optical system of claim 11, wherein the polarizer is a circular polarizer on a side of the active medium layer facing the incident light.

13. The optical system of claim 9, wherein the first light transmitting pattern is a transmitting region on an optical axis of the optical system.

14. The optical system of claim 9, wherein the first light transmitting pattern is a transmitting region spaced apart from an optical axis of the optical system.

15. The optical system of claim 9, wherein the first light transmitting pattern has a first transmitting region, a second transmitting region, and a third transmitting region, the second transmitting region is between the first and third transmitting regions, and a transmittance of the first light transmitting pattern decreases from the first transmitting region to the third transmitting region.

\* \* \* \* \*